(12) United States Patent
Fujinawa et al.

(10) Patent No.: US 7,796,179 B2
(45) Date of Patent: Sep. 14, 2010

(54) DISPLAY DEVICE, ELECTRONIC APPARATUS AND CAMERA

(75) Inventors: Nobuhiro Fujinawa, Yokohawa (JP); Akira Ohmura, Shibuya-ku (JP)

(73) Assignee: Nikon Corporation, Tokyo (JP)

( * ) Notice: Subject to any disclaimer, the term of this patent is extended or adjusted under 35 U.S.C. 154(b) by 452 days.

(21) Appl. No.: 11/883,298

(22) PCT Filed: Feb. 2, 2006

(86) PCT No.: PCT/JP2006/301754

§ 371 (c)(1),
(2), (4) Date: Jul. 30, 2007

(87) PCT Pub. No.: WO2006/082883

PCT Pub. Date: Aug. 10, 2006

(65) Prior Publication Data

US 2008/0309811 A1 Dec. 18, 2008

(30) Foreign Application Priority Data

| Feb. 3, 2005 | (JP) | 2005-027319 |
| May 11, 2005 | (JP) | 2005-138310 |
| May 11, 2005 | (JP) | 2005-138311 |
| May 12, 2005 | (JP) | 2005-139433 |

(51) Int. Cl.
H04N 5/222 (2006.01)

(52) U.S. Cl. ........................ 348/333.01; 345/87; 345/88; 345/102; 349/64; 349/65

(58) Field of Classification Search .................. 348/333.01–333.12; 345/173–184, 38, 39, 48, 345/50, 55, 56, 87, 102, 4–6, 88, 89; 349/64, 349/65
See application file for complete search history.

(56) References Cited

U.S. PATENT DOCUMENTS

| 6,801,263 B2 * | 10/2004 | Sato et al. ...................... 349/15 |
| 6,992,718 B1 * | 1/2006 | Takahara ............... 348/333.09 |
| 7,006,173 B1 * | 2/2006 | Hiyama et al. ................. 349/96 |
| 7,064,740 B2 * | 6/2006 | Daly .......................... 345/102 |
| 7,312,774 B1 * | 12/2007 | Yoshihara et al. ............. 345/87 |
| 7,505,034 B2 * | 3/2009 | Nguyen ....................... 345/211 |
| 2003/0020975 A1 * | 1/2003 | Metz et al. .................... 359/15 |
| 2004/0201793 A1 * | 10/2004 | Anandan et al. .............. 349/61 |
| 2005/0088403 A1 * | 4/2005 | Yamazaki .................... 345/102 |
| 2005/0140640 A1 * | 6/2005 | Oh et al. ..................... 345/102 |

FOREIGN PATENT DOCUMENTS

| JP | A 02-130527 | 5/1990 |
| JP | A 09-189893 | 7/1997 |
| JP | A 2003-140110 | 5/2003 |

* cited by examiner

Primary Examiner—Nhan T Tran
Assistant Examiner—Don Nguyen
(74) Attorney, Agent, or Firm—Oliff & Berridge, PLC

(57) ABSTRACT

A display device includes: a transmission-type optical image forming element that forms an image based upon image signals; an illuminating device that illuminates the optical image forming element; and a light adjustment device that allows illuminating light emitted from the illuminating device to the optical image forming element to have a specific light quantity distribution.

26 Claims, 19 Drawing Sheets (a)

(b)

(c)

Figure 1:
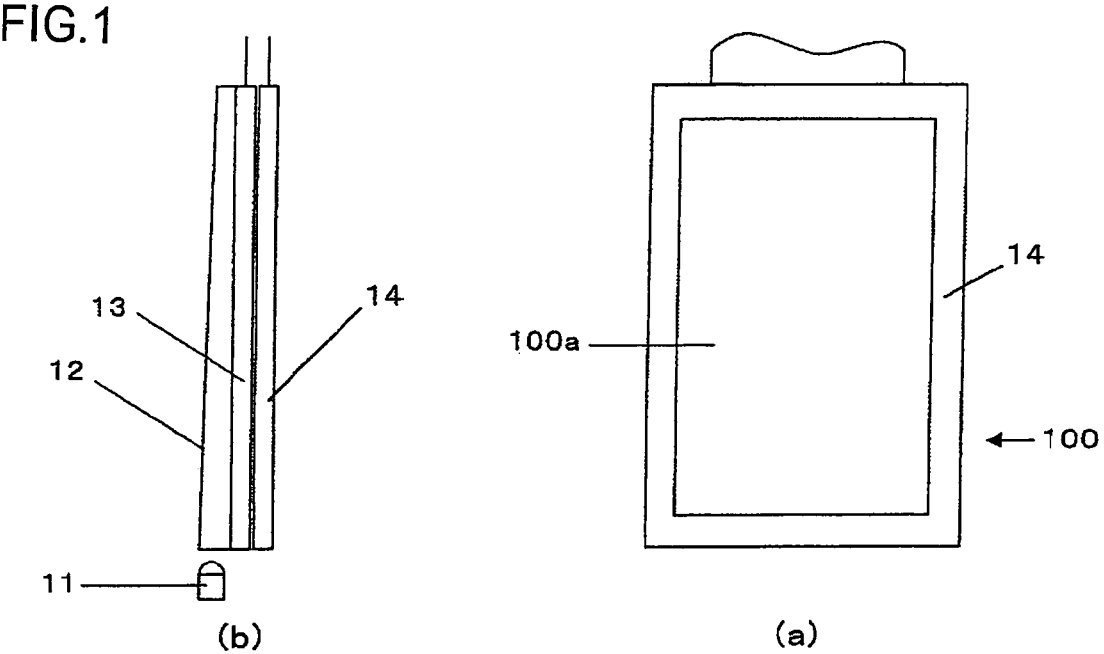

FIG.2
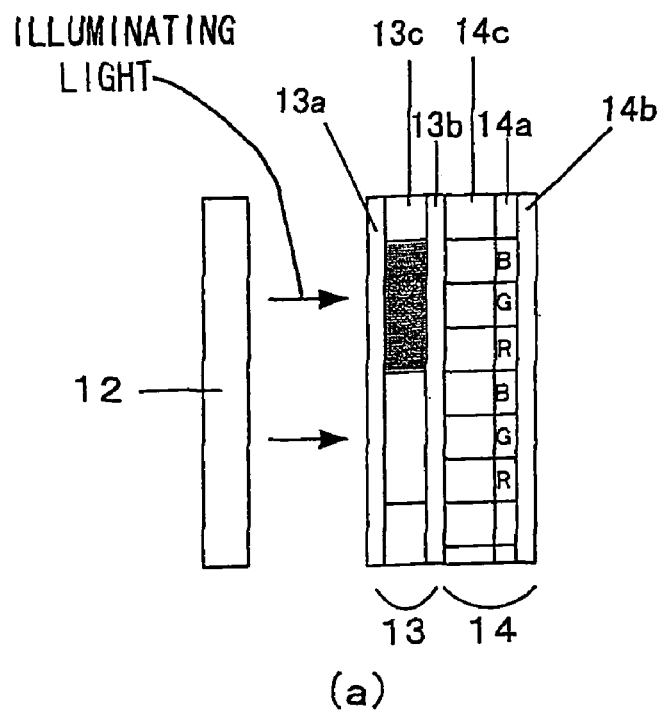
(a)
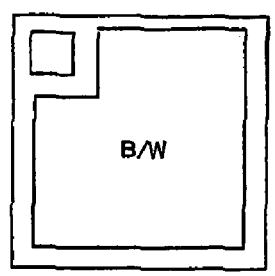
(b)
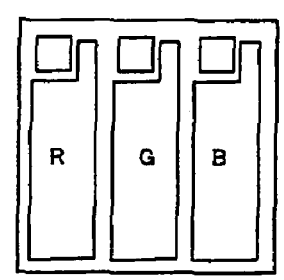
(c)

FIG.5
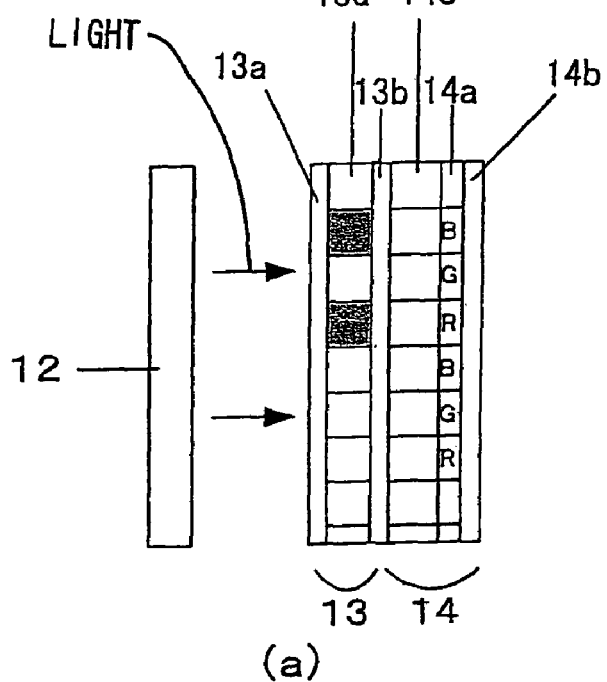
(a)
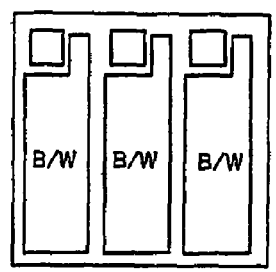
(b)
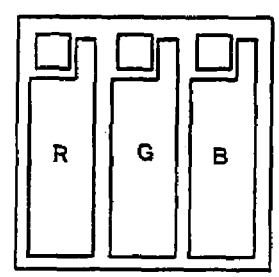
(c)

FIG.6
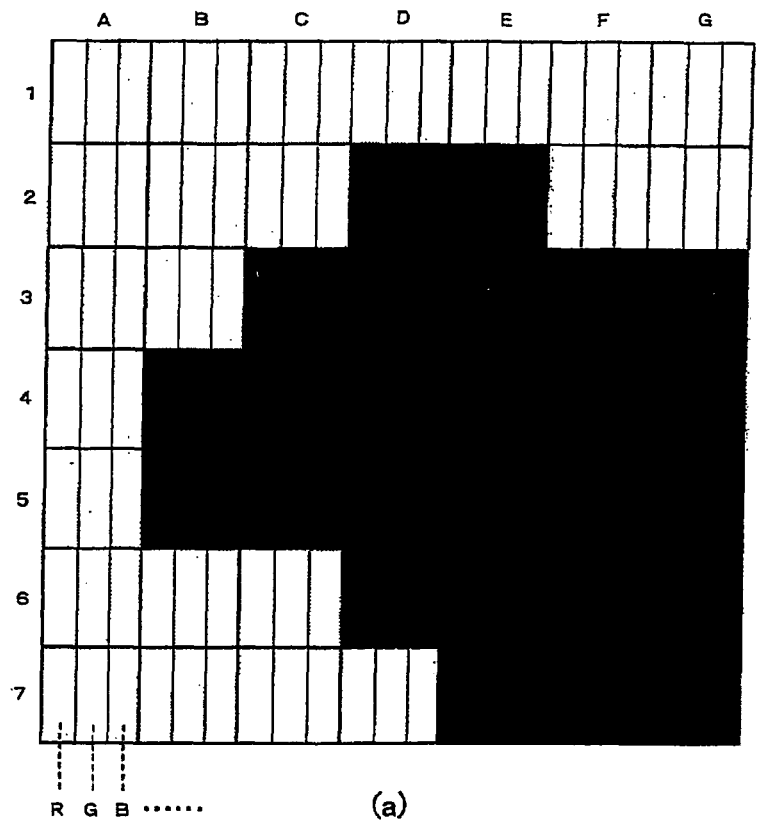
(a)
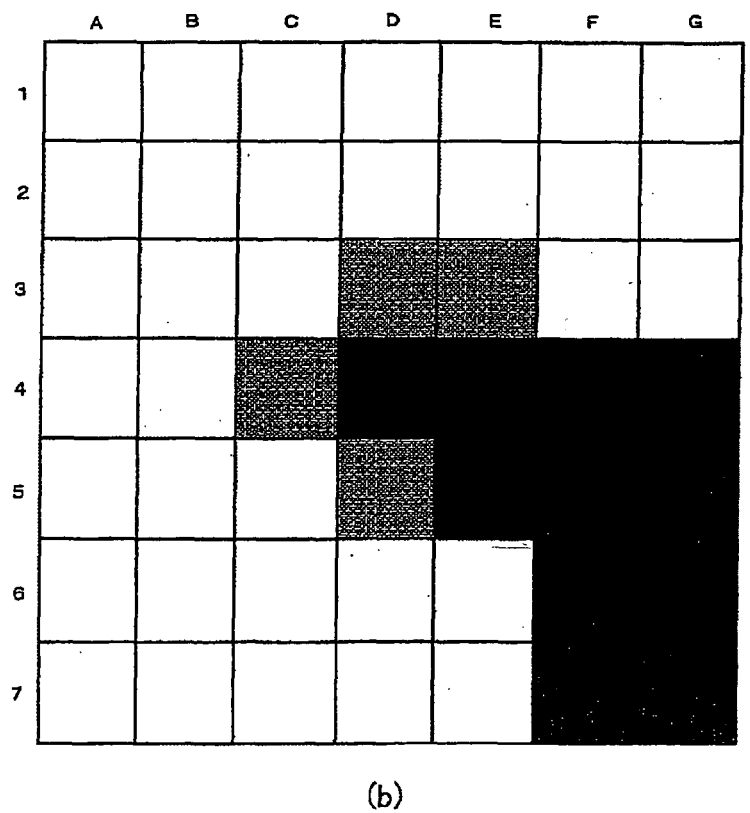
(b)

FIG.12
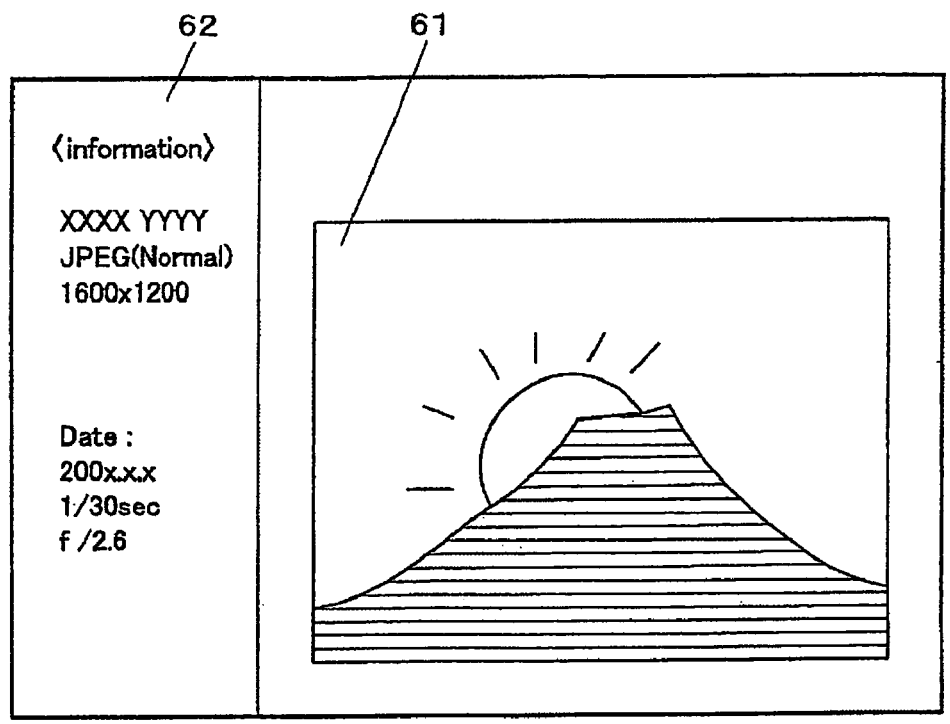
(a)
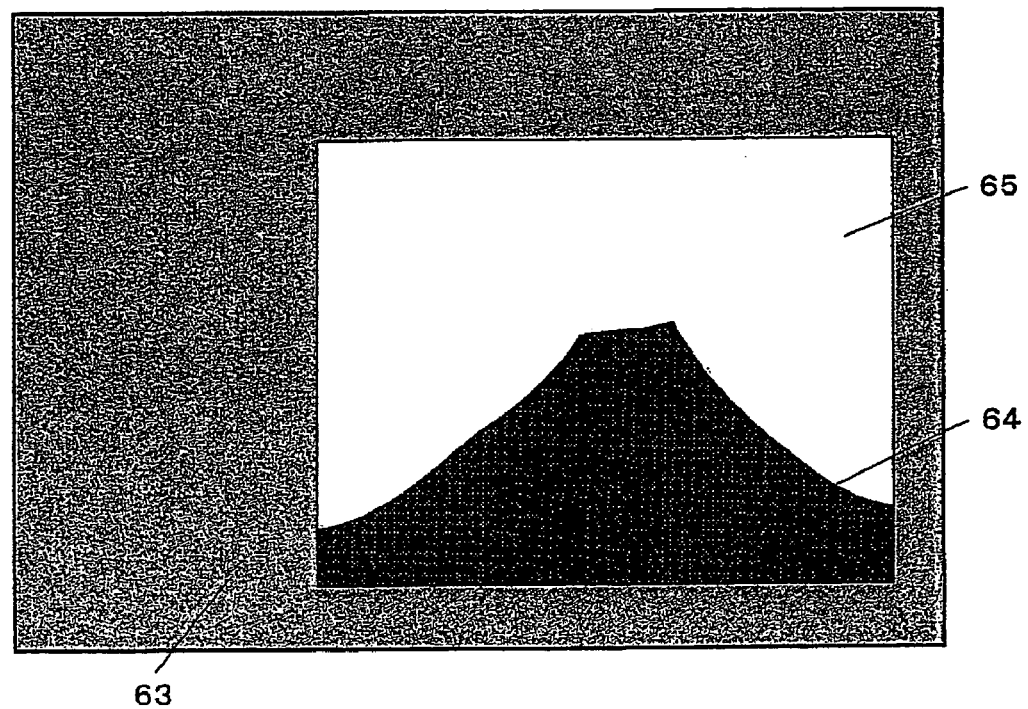
(b)

FIG.16
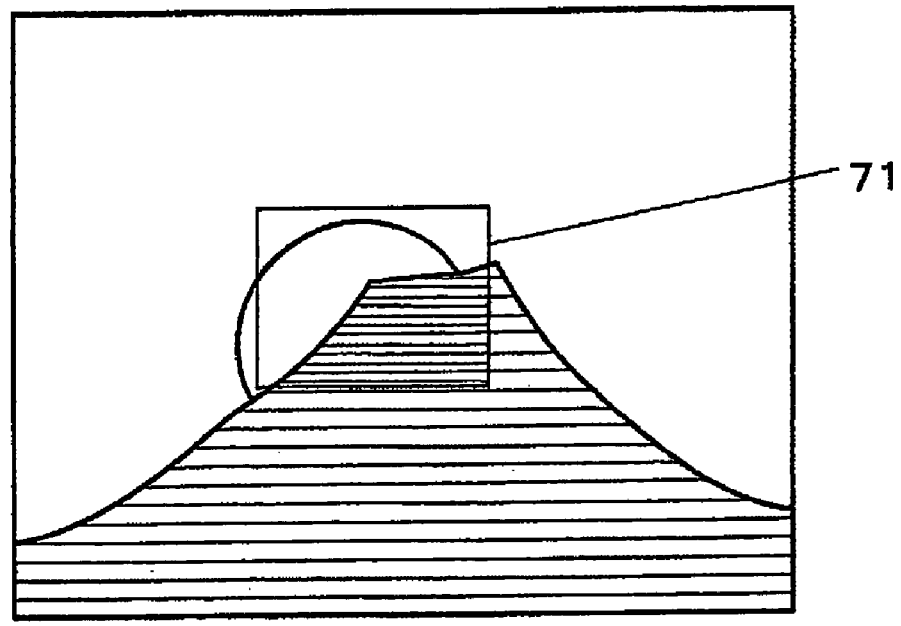
(a)
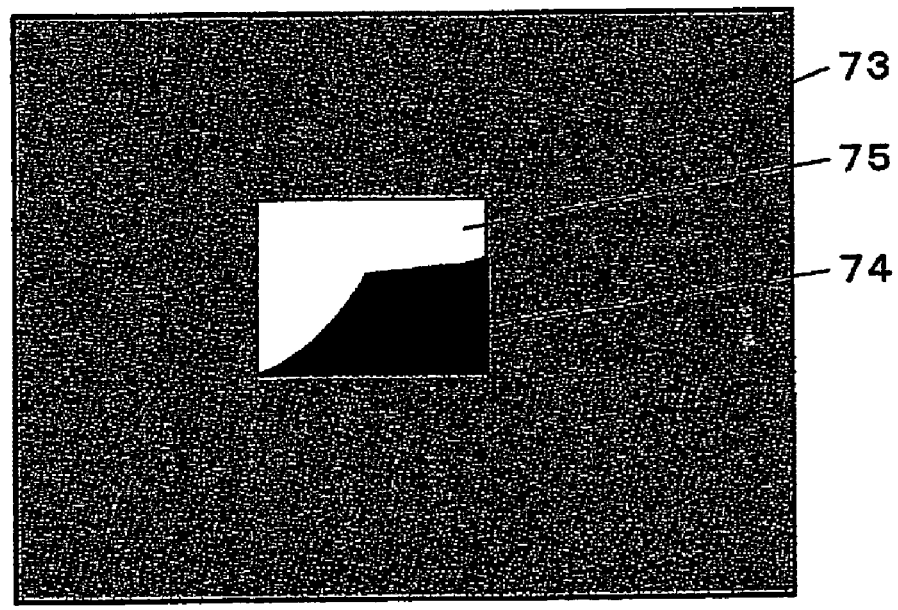
(b)

FIG.19

|  | SCENE MODE | HISTOGRAM | FILE FORMAT | DISPLAY MODE |
|---|---|---|---|---|
| STILL IMAGE | AUTO | SIGNIFICANT HALFTONE | JPEG | Normal |
|  |  |  | RAW | HDR-1 |
|  |  | MORE DATA IN UPPER AND LOWER RANGES | JPEG | HDR-1 |
|  |  |  | RAW | HDR-2 |
|  | PORTRAIT | (ALL) | (ALL) | Normal |
|  | PARTY | (ALL) | (ALL) | HDR-1 |
|  | OCEAN · SNOW | (ALL) | (ALL) | HDR-2 |
|  | SUNSET | (ALL) | (ALL) | Normal |
|  | TWILIGHT | (ALL) | (ALL) | Normal |
|  | NIGHT TIME | (ALL) | (ALL) | HDR-2 |
|  | CLOSE-UP | (ALL) | (ALL) | Normal |
|  | MUSEUM | (ALL) | (ALL) | Normal |
|  | FIREWORKS | (ALL) | (ALL) | HDR-2 |
|  | MONOCHROME COPY | (ALL) | (ALL) | Normal |
|  | BACK LIGHTING | (ALL) | (ALL) | HDR-2 |
|  | PANORAMA ASSIST | (ALL) | (ALL) | Normal |
|  | UNDER WATER | (ALL) | (ALL) | HDR-1 |
| DYNAMIC IMAGE |  | (ALL) | (ALL) | Normal |

DISPLAY DEVICE, ELECTRONIC APPARATUS AND CAMERA

TECHNICAL FIELD

The present invention relates to a display device at which an image or the like is displayed, an electronic apparatus equipped with a display device and a camera.

BACKGROUND ART

There are display devices known in the related art that adopt a method whereby an image formed at a transmission-type optical image forming element constituted with a liquid crystal panel or the like is made visible to the eye by illuminating the optical image forming element from the rear surface. The user of such a display device observes an optical image transmitted through the optical image forming element. The display brightness of a display device adopting this method is improved by raising the brightness of illuminating light (i.e., light provided through the backlight system). Patent reference literature 1 discloses a display device that includes a backlight unit constituted with a cold-cathode fluorescent lamp and a light emitting diode array and provides a bright display by raising the brightness of the illuminating light.

Patent reference literature 1: Japanese Laid Open Patent Publication No. 2003-140110

DISCLOSURE OF THE INVENTION

Problems to be Solved by the Invention

An optical image forming element expresses an image over a high-brightness area in the display screen by raising the transmittance in the area to be expressed with a high level of brightness and expresses an image over a low-brightness area in the display screen by lowering the transmittance in the area to be expressed as dark. Generally speaking, there are limits to how high and how low the transmittance at an optical image forming element can be set. For this reason, when the level of brightness of the backlight unit is raised as described above, a phenomenon whereby an image area to be rendered "black" (i.e., an area in correspondence to which the transmittance at the optical image forming element needs to be set to the lowest level) in the display screen is not completely shielded from the illuminating light and a small quantity of illuminating light is transmitted through the area, resulting in noticeable light leakage.

Means for Solving the Problems

A display device according to a first aspect of the present invention includes: a transmission-type optical image forming element that forms an image based upon image signals; an illuminating device that illuminates the optical image forming element; and a light adjustment device that allows illuminating light emitted from the illuminating device to the optical image forming element to have a specific light quantity distribution.

In the display device according to the first aspect, it is preferable that the light adjustment device is disposed between the illuminating device and the optical image forming element and adjusts a quantity of illuminating light originating from the illuminating device in each unit area. The light adjustment device may be constituted with a monochrome liquid crystal panel at which the quantity of illuminating light originating from the illuminating device is reduced in each matrix area. The illuminating device may be provided with a light guide plate; and the light guide plate, the liquid crystal panel and the optical image forming element may be layered one on top of another. It is preferable that the light adjustment device reduces the quantity of illuminating light for an area to be rendered dark within a display screen. The light adjustment device may reduce the quantity of illuminating light when a brightness level indicated in display data is equal to or lower than a predetermined threshold value representing a light leakage inhibiting cutoff point. The light adjustment device may increase/decrease the threshold value in correspondence to an illumination brightness level set at the illuminating device.

The display device according to the first aspect may further include a control device that controls the light adjustment device so as to reduce the quantity of illuminating light over a range smaller than an area to be displayed with a brightness level lower than a predetermined brightness level. It is preferable that the control device controls the light adjustment device so as to alter in steps a rate at which the quantity of illuminating light is reduced over a boundary of an area where the quantity of illuminating light is to be reduced. The control device may determine the area where the quantity of illuminating light is to be reduced based upon brightness information in the image signal corresponding to a target pixel on the optical image forming element and pixels around the target pixel. The control device may determine a rate, at which the quantity of illuminating light to illuminate a target pixel is to be reduced based upon brightness information indicated in the image signal corresponding to the target pixel on the optical image forming element and pixels around the target pixel.

In the display device according to the first aspect, the light adjustment device may be disposed between the illuminating device and the optical image forming element; and the display device may further include a light adjustment control device that controls the light adjustment device so as to illuminate specific areas on the optical image forming element with different quantities of illuminating light. It is preferable that the light adjustment control device controls the light adjustment device so as to illuminate an image display area and a character display area with different quantities of illuminating light. A light emission control device that controls a quantity of light emitted from the illuminating device may be further provided, and the light adjustment control device may control the light adjustment device so as to reduce the quantity of illuminating light that has been raised via the light emission control device over the character display area.

A camera according to a second aspect of the present invention includes: the display device; an imaging device; and a focus adjustment control device, and the light adjustment control device controls the light adjustment device so as to illuminate an area corresponding to a focus area and an area corresponding to an area other than the focus area with different quantities of illuminating light. It is preferable that the light adjustment control device controls the light adjustment device so as to reduce the quantity of illuminating light, having been raised via the light emission control device, over the area corresponding to the area other than the focus area.

In the display device according to the first aspect, the light adjustment device may be disposed between the illuminating device and the optical image forming element; and the display device may further include a display control device that individually controls the illuminating device and the light adjustment device so as to switch, in response to a display switch instruction, between a normal display mode in which a first light emission quantity is set for the illuminating device and a light reduction rate to be achieved via the light adjustment device is set to a minimum level and a high-quality image display mode in which a second light emission quantity greater than the first light emission quantity is set for the illuminating device and the light reduction rate to be achieved via the light adjustment device is set to the minimum level. It is preferable that the light reduction rate to be achieved via the light adjustment device is controlled in units of specific areas defined on the optical image forming element; and that the display control device also individually controls the illuminating device and the light adjustment device so as to switch in response to a display switch instruction to a second high-quality image display mode in which a third light emission quantity greater than the second light emission quantity is set for the illuminating device and the quantity of illuminating light, used to illuminate an area on the optical image forming element corresponding to display data indicating a display brightness level equal to or lower than a predetermined value, is reduced.

A camera according to a third aspect of the present invention includes: the display device; an imaging device that captures a subject image and outputs image data; and an operation member that generates a signal for setting one of a photographing mode for displaying at the display device an image based upon image data output from the imaging device, a reproduction mode for displaying at the display device an image based upon recorded image data, and a menu mode for displaying menu information at the display device menu information, and the display control device individually controls the illuminating device and the light adjustment device so as to select a specific display mode in response to the signal generated at the operation member.

In the camera according to the third aspect, it is preferable that the display control device individually controls the illuminating device and the light adjustment device so as to switch to the normal display mode when the signal from the operation member indicates one the photographing mode and the menu mode and to switch to the high-quality image display mode when the signal from the operation member indicates the reproduction mode. The display control device may individually control the illuminating device and the light adjustment device so as to switch from the high-quality image display mode to the second high-quality image display mode when the signal from the operation member indicates the reproduction mode and a number of sets of data indicating brightness levels equal to or lower than a predetermined low brightness level and a number of sets of data indicating brightness levels equal to or higher than a predetermined high brightness level contained in the display data are each equal to or greater than a predetermined value. The display control device may individually control the illuminating device and the light adjustment device so as to switch from the high-quality image display mode to the normal display mode when the signal from the operation member indicates the reproduction mode and another signal constituting a thumbnail display instruction is also generated at the operation member. The display control device may execute control so as to first switch to the normal display mode and then to the high-quality image display mode after the image is held on display in the normal display mode over a predetermined length of time when the signal from the operation member indicates the reproduction mode.

An electronic apparatus according to a fourth aspect of the present invention is equipped with any one of the above described display devices.

It is to be noted that the optical image forming element, the illuminating device, the light adjustment device, the control device, the light adjustment control device, the light emission control device, the imaging device, the focus adjustment control device, the display control device, and the operation member may be replaced with an optical image forming means, an illuminating means, a light adjustment means, a control means, a light adjustment control means, a light emission control means, an imaging means, a focus adjustment control means, a display control means, and an operation means, respectively.

Effect of the Invention

By adopting the present invention, the occurrence of light leakage can be minimized without lowering the brightness in a display area to be expressed with a high level of brightness.

BRIEF DESCRIPTION OF THE DRAWINGS (FIG. 1) A front view and a side elevation showing the structure adopted in a display device achieved in a first embodiment of the present invention, respectively presented in (a) and (b)

(FIG. 2) A partial enlargement of FIG. 1(b) presented in (a), a specific area divided areas in a matrix pattern at a TN liquid crystal panel shown in (b), and specific areas divided in a matrix pattern at the liquid crystal panel shown in (c)

(FIG. 3) The relationship between the data brightness and the light adjustment rate (FIG. 4) The relationship between the brightness of the illuminating light and the threshold-value (FIG. 5) An enlargement of the display device achieved in variation 1 presented in (a), specific areas divided in a matrix pattern at the TN liquid crystal panel shown in (b), and specific divided in a matrix pattern at the liquid crystal panel shown in (c)

(FIG. 6) Specific areas divided in a matrix pattern at the liquid crystal panel achieved in a second embodiment of the present invention presented in (a), and specific areas divided in a matrix pattern at the TN liquid crystal panel presented in (b)

(FIG. 7) Specific areas divided in a matrix pattern at the TN liquid crystal panel achieved in variation 2

(FIG. 8) A photo viewer equipped with a display device (FIG. 9) A photo viewer achieved in a third embodiment of the present invention (FIG. 10) A front view and a side elevation showing the structure adopted in the display device, respectively presented in (a) and (b)

(FIG. 11) A block diagram showing the essential structure adopted in the photo viewer (FIG. 12) An image formed via the second display module and an image, formed via the first display module, respectively shown in (a) and (b)

(FIG. 13) The relationship between the brightness of the illuminating light and the threshold value (FIG. 14) An electronic camera achieved in a fourth embodiment of the present invention (FIG. 15) A block diagram showing the essential structure adopted in the electronic camera (FIG. 16) An image formed via the second display module and an image formed via the first display module, respectively shown in (a) and (b)

(FIG. 17) An example of a histogram indicating the brightness distribution (FIG. 18) An example of a histogram indicating the brightness distribution (FIG. 19) The relationship between the scene mode and the display mode

BEST MODE FOR CARRYING OUT THE INVENTION

The best mode for carrying out the present invention is now explained in reference to the drawings.

First Embodiment

FIGS. 1(a) and 1(b) illustrate the structure adopted in the display device in the first embodiment of the present invention, respectively in a front view and a side elevation. A display device 100 in FIG. 1(a) displays an image, text or the like within its effective display area 100a.

As shown in FIG. 1(b), the display device 100 includes a first display module 13 and a second display module 14 layered one on top of another. The two layered display modules 13 and 14 are illuminated by a backlight member from the side on which the first display module 13 is present. The backlight member is constituted with a high-brightness white LED 11 and a light guide plate 12. The light guide plate 12 ranges over an area which is greater than the effective display area 100a. The light guide plate 12 converts light emitted from the white LED 11 and having entered the light guide plate 12 from a side surface (the bottom in FIG. 1(b)) of the light guide plate 12 to plane illuminating light, which achieves a uniform brightness level within the effective display area 100a and illuminates the first display module 13 with this plane illuminating light.

FIG. 2(a) shows the internal structure of the display device 100 in a partial enlargement of FIG. 1(b). FIG. 2(a) shows the first display module 13 constituted with a monochrome liquid crystal display element that includes, for instance, a TN-type liquid crystal panel 13c of the known art disposed between a first polarizing plate 13a and a second polarizing plate 13b. The first polarizing plate 13a and the second polarizing plate 13b are set so that the direction along which light passing through the second polarizing plate 13b is polarized and the direction along which light passing through the first polarizing plate 13a is polarized are offset relative to each other by 90°.

While no voltage is applied thereto from transparent electrodes (not shown), the liquid crystal panel 13c assumes a specific liquid crystal molecule arrangement (orientation) within its liquid crystal layer so as to rotate the direction of polarization of light having entered the liquid crystal layer by 90°. Thus, polarized light having entered the liquid crystal panel 13c via the first polarizing plate 13a is first rotated by 90° inside the liquid crystal layer, passes through the second polarizing plate 13b, exits the first display module 13 and enters the second display module 14 as illuminating light.

Once a voltage is applied to the liquid crystal panel 13c from the transparent electrodes (not shown), the liquid crystal molecule arrangement inside the liquid crystal layer is altered and the polarizing direction for the incident light is no longer rotated by 90°. As a result, the polarized light having entered the liquid crystal panel 13c via the first polarizing plate 13a is no longer allowed to pass through the second polarizing plate 13b, resulting in a reduction in the amount of transmitted light departing the first display module 13. Since the extent to which the liquid crystal molecule arrangement is altered is in proportion to the level of voltage applied to the liquid crystal panel, the rate of rotation of the polarizing direction with regard to the light advancing through the liquid crystal layer, too, is in proportion to the level of voltage applied to the liquid crystal panel. Thus, the quantity of illuminating light transmitted through the first display module 13 to enter the second display module 14 decreases as the level of voltage applied to the liquid crystal panel 13c increases.

The liquid crystal panel 13c adopts a structure that allows a given voltage, corresponding to a drive signal input from a display control circuit to be detailed later based upon an image signal to be applied separately to each specific area (pixels) among divided areas forming a matrix pattern. Thus, the quantity of illuminating light entering the second display module 14 can be increased/decreased in units of the individual pixels.

The second display module 14 is constituted with a TFT color liquid crystal display element of the known art that includes, for instance, a color filter 14a disposed between a liquid crystal panel 14c and a polarizing plate 14b. The liquid crystal panel 14c assumes an orientation on the side where its surface of entry is located (on the side toward the first display module 13), which matches the direction of the polarization of light passing through the second polarizing plate 13b. The polarizing plate 14b is set so that the direction along which light passing through the polarizing plate 14b is polarized is offset by 90° relative to the direction along which the light passing through the second polarizing plate 13b mentioned earlier is polarized.

While no voltage is applied thereto from transparent electrodes (not shown), the liquid crystal panel 14c assumes a specific liquid crystal molecular orientation within its liquid crystal layer so as to rotate the direction of polarization of light having entered the liquid crystal layer by 90°. Thus, polarized light having entered the liquid crystal panel 14c via the first display module 13 is first rotated by 90° inside the liquid crystal layer, passes through the color filter 14a and the polarizing plate 14b and exits the second display module 14.

Once a voltage is applied to the liquid crystal panel 14c from the transparent electrodes (not shown), the liquid crystal molecular orientation inside the liquid crystal layer is altered and the polarizing direction for the incident light is no longer rotated by 90°. As a result, the polarized light having entered the liquid crystal panel 14c is no longer allowed to pass through the polarizing plate 14b after passing through the color filter 14a, resulting in a reduction in the amount of transmitted light departing the second display module 14.

The color filter 14a includes color filters in R, G and B colors arrayed in an alternating arrangement. The liquid crystal panel 14c adopts a structure that allows a given voltage, corresponding to a drive signal input from the display control circuit to be detailed later based upon an image signal to be applied separately to each specific area (sub-pixels at the color filters) among the divided areas forming a matrix pattern. Thus, the quantity of transmitted light exiting the second display module 14 can be increased/decreased in units of the individual colors.

FIGS. 2(b) and 2(c) illustrate specific areas among the divided areas forming matrix patterns at the liquid crystal panel 13c and at the liquid crystal panel 14c respectively. As shown in FIG. 2(b), the pixels at the liquid crystal panel 13c assume a substantially square shape. The quantity of illuminating light to enter the second display module 14 can be adjusted in units of individual, substantially square-shaped pixels.

As shown in FIG. 2(c), the liquid crystal panel 14c includes sub-pixels disposed so that a set of an R sub-pixel, a G sub-pixel and a B sub-pixel corresponds to a single pixel (assuming a substantially square shape) such as that shown in FIG. 2(b). Namely, the quantity of illuminating light to enter the second display module 14 can be adjusted in units of individual sets of R, G and B sub-pixels.

The effective display area 100a of the display device 100 corresponds to an effective display area of the second display module 14, whereas the first display module 13 assumes an effective display area greater than, at least, the effective display area 100a. The light guide plate 12, the first display module 13 and the second display module 14 are layered one on top of another in substantially close contact with each other, thereby constituting the display device 100.

The second display module 14 in the display device 100 modulates light from the white LED 11 in correspondence to image signals provided thereto, so as to generate optical images in the R, G and B colors. Since the liquid crystal panel 14c in the second display module 14 is driven by adopting a method similar to a drive method of the known art normally adopted in conjunction with a liquid crystal display element, its explanation is omitted. The user is able to observe a full color image composed with transmitted red light, transmitted green light and transmitted blue light emitted from the second display module 14.

In addition, the first display module 13 in the display device 100 attenuates the light provided from the white LED 11 based upon image signals provided thereto, so as to prevent light leakage in any low-brightness area in the image to be observed. The liquid crystal panel 13c constituting the first display module 13 is driven as described below.

Figure 3:
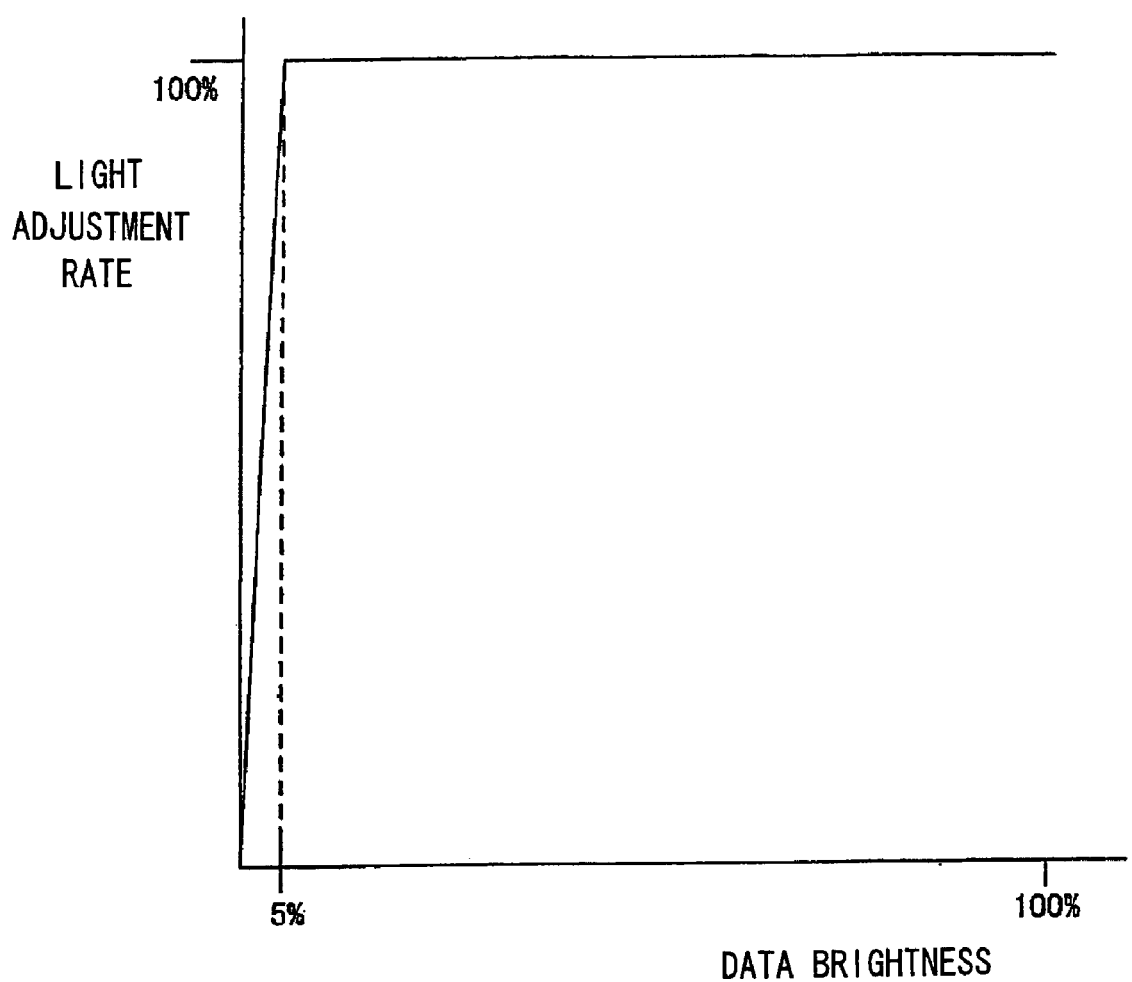

FIG. 3 illustrates the relationship between the brightness level indicated in the image signal (data to be displayed at the second display module 14) provided to the display device 100 and the light adjustment rate representing the rate of adjustment executed on the illuminating light at the first display module 13 (the transmittance of the illuminating light). In FIG. 3, the data brightness is indicated along the horizontal axis, as a percentage relative to the maximum value (full scale) input that can be assumed in input signals to the display device 100. The transmittance of the illuminating light is indicated along the vertical axis as a percentage relative to the transmittance (assumed to be 100% for purposes of convenience) achieved when no voltage is applied to the electrodes at the liquid crystal panel 13c.

FIG. 3 indicates that if the level of brightness in the data held in an image signal (the brightness corresponding to at least one color among R, G and B) exceeds a predetermined threshold value (e.g., 5% of the full scale value), no voltage is applied to a matrix area at the liquid crystal panel 13c corresponding to the particular image signal. Namely, the transmittance with regard to the quantity of illuminating light to be transmitted through the first display module 13 is set to the maximum level (lowest light reduction rate) so as to maximize the quantity of illuminating light entering the second display module 14 in correspondence to any area where the brightness level exceeds 5% of the full scale value.

In addition, if the brightness level (the brightness corresponding to all three colors, R, G and B) of the data held in an image signal is equal to or less than 5% of the full scale value, a voltage is applied in correspondence to the specific pixel so as to achieve the level of transmittance in proportion to the level of brightness over the matrix area at the liquid crystal panel 13c corresponding to the particular image signal. Namely, the transmittance with regard to the quantity of illuminating light to be transmitted through the first display module 13 is set to the maximum level (the lowest light reduction rate) so as to maximize the quantity of illuminating light entering the second display module 14 in correspondence to any area where the brightness level matches 5% of the full scale value. In addition, the transmittance of the illuminating light from the first display module 13 is gradually lowered (the light reduction rate is gradually raised) so as to gradually reduce the quantity of illuminating light entering the second display module 14 in correspondence to any area where the brightness level is less than 5% of the full scale value. Furthermore, the transmittance of the illuminating light from the first display module 13 is set to the lowest level (the light reduction rate is set to the maximum level) so as to set the quantity of illuminating light entering the second display module 14 substantially to 0 in correspondence to any area with a brightness level equal to 0% of the full scale value.

As a result, the quantity of illuminating light used to illuminate an area to be rendered dark in the display screen (i.e., an area in correspondence to which the transmittance is set to the lowest level at the liquid crystal panel 14c constituting the second display module 14) is reduced. In other words, even when the fully shielded state is not achieved at the liquid crystal panel 14c, the absolute level of transmitted light in the R, G and B colors transmitted through the liquid crystal panel 14c over this particular area is minimized, so that the user cannot detect any light leakage in the image he is observing. In addition, since light leakage does not manifest readily, the level of brightness can be raised at the light source, which, in turn, allows the dynamic range of the display image to be increased.

The brightness level at 5% of the full scale value corresponds to 12.5 LSB if image signals are expressed on an eight-bit full scale. It corresponds to 204 LSB if image signals are expressed on a 12-bit full scale.

The following advantageous effects can be achieved in the first embodiment described above.

(1) A common polarizing plate 13b is utilized in conjunction with the liquid crystal panel 13c of the first display module 13 and the liquid crystal panel 14c of the second display module 14. Thus, compared to a structure with a polarizing plate disposed on each of the two sides of each liquid crystal panel, the total number of polarizing plates required in the structure achieved in the first embodiment is reduced by one.

(2) The second display module 14 is illuminated with illuminating light having been transmitted through the first display module 13 and the illuminating light can be adjusted (the quantity of illuminating light can be adjusted) in units of the individual specific areas (in units of individual sets of R, G and B sub-pixels in the example explained above). Namely, a specific light quantity distribution is assumed with regard to the illuminating light. As a result, specific areas that need to be rendered dark in the display screen alone can be selectively rendered dark. Since light leakage is not allowed to occur readily over dark areas without lowering the brightness in areas that need to be rendered bright, an image with a high image quality can be displayed. This feature is particularly effective in applications that require images to be expressed over a wide dynamic range, such as computer graphic images.

(3) The backlight member, which includes the light guide plate 12, the first display module 13, which includes the liquid crystal panel 13c, and the second display module 14, which includes the liquid crystal panel 14c and the color filter 14a are layered one on top of another in substantially close contact. Thus, the display device 100 can be provided as a compact unit in which light can be adjusted in units of the individual pixels.

The threshold value at which the transmittance of illuminating light at the first display module 13, i.e., the quantity of illuminating light to be transmitted through the first display module 13, is switched for purposes of preventing light leakage as described above is not limited to 5%, as indicated in FIG. 3, and should be adjusted to the optimal value, e.g., 3% or 15%, as necessary.

Figure 4:
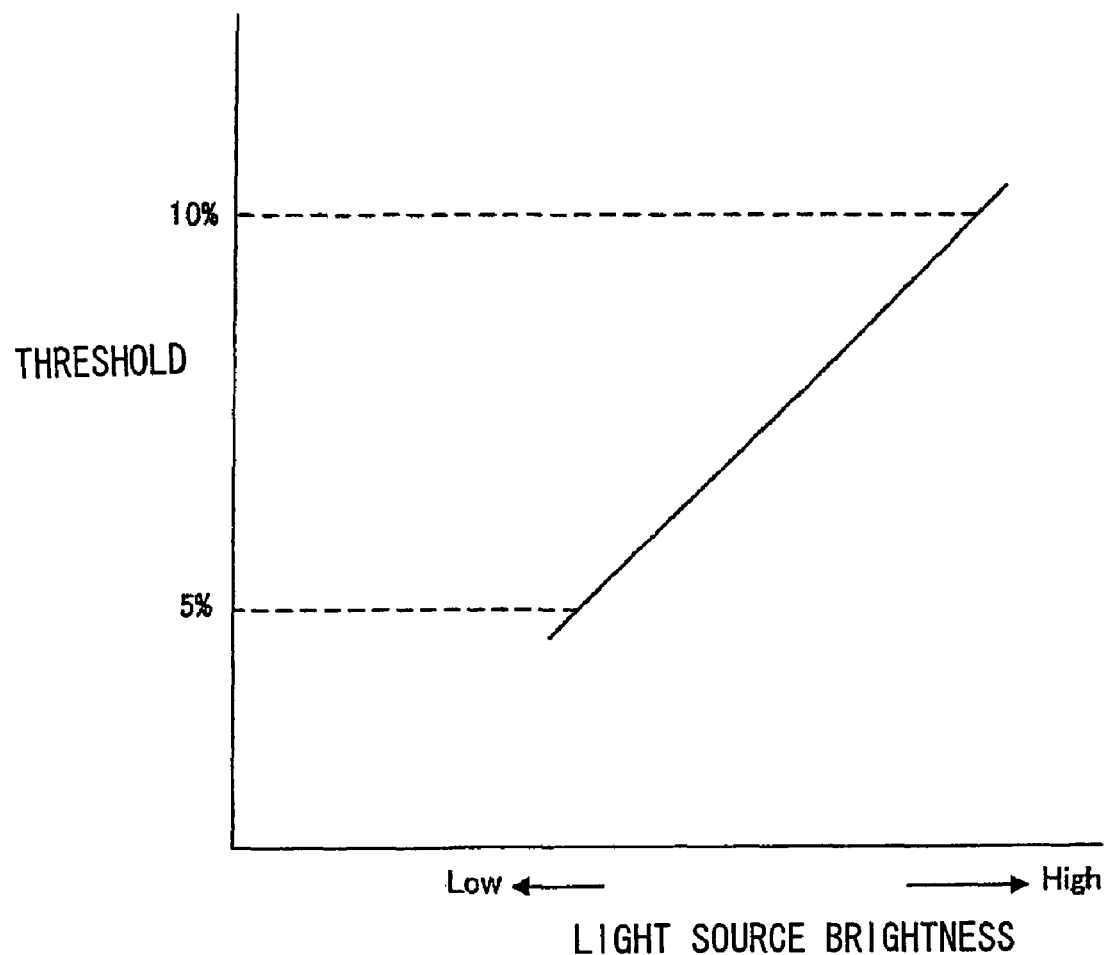

In addition, the threshold value may be varied in correspondence to the brightness level of the illuminating light provided via the backlight member (11, 12). FIG. 4 shows the relationship between the brightness of the illuminating light provided via the backlight member (11, 12) (light source brightness) and the threshold value. In FIG. 4, the light source brightness is indicated along the horizontal axis and the threshold value is indicated along the vertical axis.

FIG. 4 indicates that a higher threshold value is set as the light source brightness increases, within an approximate range of, for instance, 5%~10% of the full scale, in proportion to the increase in the light source brightness. In this case, the absolute value of the transmitted light in the R, G and B colors transmitted through an area to be rendered dark in the display screen (i.e., an area in correspondence to which the transmittance is set to the lowest level at the liquid crystal panel 14c constituting the second display module 14) can be minimized even when the light source brightness is high. Thus, the user cannot detect any light leakage in the image he is observing in spite of the high light source brightness.

When the brightness of the illuminating light provided by the backlight member (11, 12) is variable (as in the third and fourth embodiments) the threshold value should be adjusted in correspondence to the level of the illuminating light brightness setting. When the level of the brightness of the illuminating light provided by the backlight member (11, 12) is fixed (cannot be altered), the value corresponding to the brightness level of the illuminating light provided by the specific backlight member (11, 12) mounted at the display device 100 may be selected as the threshold value at time of, such as, adjustment and maintenance of the display device 100.

In addition, the control mode may be switched in correspondence to the number of gradations in the image signal provided to the display device 100 (in correspondence to the bit length in the gradation expression). For instance, if the number of gradations in the image signal allows an eight-bit gradation expression, the transmittance for the illuminating light indicating the quantity of illuminating light to be transmitted through the first display module 13 may be set to the highest level over the entire effective display area 100a, so as to maximize the quantity of illuminating light entering the second display module 14. If, on the other hand, the number of gradations in the image signal allows a 12-bit or 16-bit gradation expression, the transmittance of illuminating light indicating the quantity of illuminating light to be transmitted through the first display module 13 to illuminate the second display module 14 may be adjusted in units of individual specific areas (in units of individual sets of R, G and B sub-pixels) in correspondence to the image signal provided to the display device.

(Variation 1)

The quantity of illuminating light to enter the second display module 14 may be adjusted in correspondence to each sub-pixel assuming a specific color among the R, G and B colors. FIG. 5(a) is an enlargement showing the internal structure of such a display device 100. FIG. 5(a) shows the first display module 13 constituted with a monochrome liquid crystal display element that includes, for instance, a TN-type liquid crystal panel 13d of the known art disposed between the first polarizing plate 13a and the second polarizing plate 13b. The first polarizing plate 13a and the second polarizing plate 13b are set so that the direction along which light passing through the second polarizing plate 13b is polarized and the direction along which light passing through the first polarizing plate 13a is polarized are offset relative to each other by 90° as in the first embodiment explained earlier.

FIGS. 5(b) and 5(c) respectively show specific areas among the divided areas forming a matrix pattern at the TN liquid crystal panel 13d and at the liquid crystal panel 14c in FIG. 5(a). FIG. 5(b) shows pixels at the TN liquid crystal panel 13d, each disposed in correspondence to one of the sub-pixels at the second display module 14. The quantity of illuminating light to enter the second display module 14 can be adjusted in units of the individual sub-pixels.

FIG. 5(c) shows sub-pixels at the liquid crystal panel 14c, each assuming the R color, the G color or the B color and each corresponding to one of the pixels in FIG. 5(b). Namely, the quantity of illuminating light to enter the second display module 14 can be adjusted in units of individual sub-pixels each assuming the R color, the G color or the B color. This structure enables super-fine control under which light leakage can be prevented effectively.

The ratio of the numbers of divided areas forming a matrix pattern at the first display module 13 and the number of divided areas forming the matrix pattern at the second display module 14 is not limited to 1:3 (a set of three sub-pixels in the R, G and B colors corresponding to one divided area at the first display module 13) in the embodiment described earlier or 1:1 (each sub-pixel corresponding to one divided area at the first display module) in the variation, and light adjustment may be executed at the areal ratio of 1:12 with every four sets of R, G and B sub-pixels made to correspond to a single divided area at the first display module or at an areal ratio of 1:27 with every nine sets of R, G and B sub-pixels made to correspond to a single divided area at the first display module.

Second Embodiment

When adjusting the transmittance at a given matrix area of the first display module 13 (liquid crystal panel 13c), the transmittance at the matrix area in the first display module 13 (liquid crystal panel 13c), which illuminating light is to be transmitted to the corresponding set of RGB sub-pixels on the second display module 14, may be determined based upon the brightness level at the subject RGB sub-pixel set on the second display module 14 and the brightness levels of sub-pixel sets located around the subject sub-pixel set. The brightness levels are indicated by image signals provided to the display device 100.

FIGS. 6(a) and 6(b) respectively show specific areas divided in matrix patterns at the liquid crystal panel 14c and at the liquid crystal panel 13c.

As shown in FIG. 6(b), the pixels at the liquid crystal panel 13c assume a substantially square shape. The quantity of illuminating light to enter the second display module 14 can be adjusted in units of individual, substantially square-shaped pixels. As shown in FIG. 6(a), the liquid crystal panel 14c includes sub-pixels disposed so that a set of an R sub-pixel, a G sub-pixel and a B sub-pixel corresponds to a single pixel (assuming a substantially square shape) in FIG. 6(b). Namely, the quantity of illuminating light to enter the second display module 14 can be adjusted in units of individual sets of R, G and B sub-pixels.

As in the first embodiment, the display device 100 generates optical images in the color R, the G color and the B color as the second display module 14 modulates the light from the white LED 11 in correspondence to image signals provided thereto. The user is thus able to observe a full-color image composed with the transmitted light in the R color, the transmitted light in the G color and the transmitted light in the B color emitted from the second display module 14. In the example presented in FIG. 6(*a*), with each set of RGB sub-pixels constituting a pixel, 23 pixels among the total of 49 pixels are rendered white and the remaining 26 pixels are rendered black in the display.

In addition, the display device 100 reduces the extent of light leakage in a low-brightness area in the image being viewed by attenuating via the first display module 13 the light from the white LED 11, as described below, in correspondence to image signals supplied thereto.

Assuming that the pixel (=set of RGB sub-pixels) taking up position row 2/column D in FIG. 6(*a*) is the target pixel, the display device 100 calculates a brightness level average value by using all the data (three colors corresponding to R, G and B×nine sets) in the image signals held in the nine pixels present within a three pixel (horizontal)×three pixel (vertical) range centered around the target pixel. In this case, there are four pixels to be rendered white and five pixels to be rendered black, and, accordingly, assuming that the brightness corresponding to white is 1, the brightness average value is calculated to be (1 (white)×4+0 (black)×5)/9=0.44. Since this average value exceeds the predetermined threshold value (e.g., 12% of the full scale value), no voltage is applied to the matrix area (through which the illuminating light is transmitted to the target pixel) at the liquid crystal panel 13*c* corresponding to the target pixel (=row 2/column D). Namely, if the average value of the brightness levels at the target pixel and the surrounding pixels exceeds 12% of the full scale value, the transmittance of the illuminating light at the first display module 13 over the area corresponding to the target pixel is set to the maximum level so as to maximize the quantity of illuminating light to enter the second display module 14 through this area.

For a target pixel (=set of RGB sub-pixels) taking up position row 3/column D in FIG. 6(*a*), the display device 100 calculates a brightness level average value by using all the data (three colors corresponding to R, G and B×nine sets) in the image signals held in the nine pixels present within a three pixel (horizontal)×three pixel (vertical) range centered around the target pixel. In this case, there is one pixel to be rendered white and eight pixels to be rendered black, and, accordingly, the brightness average value is calculated to be (1 (white)×1+0 (black)×8)/9=0.11. When the average value of the brightness levels at the target pixel and the surrounding pixels is less than 12% of the full scale value, as in this case, a voltage is applied to the corresponding matrix area at the liquid crystal panel 13*c* so as to gradually lower the transmittance of the illuminating light to be transmitted to the target pixel (=row 3/column D) by an extent corresponding to the brightness level average value.

For a target pixel (=set of RGB sub-pixels) taking up position row 4/column D in FIG. 6(*a*), the display device 100 calculates a brightness level average value by using all the data (three colors corresponding to R, G and B×nine sets) in the image signals held in the nine pixels present within the three pixel (horizontal)×three pixel (vertical) range centered around the target pixel. In this case, there are no pixels to be rendered white and nine pixels to be rendered black, and, accordingly, the brightness average value is calculated to be (1 (white)×0+0 (black)×9)/9=0. When the average value of the brightness levels at the target pixel and the surrounding pixels is equal to 0, as in this case, a voltage is applied to the corresponding matrix area at the liquid crystal panel 13*c* so as to ensure that substantially no illuminating light is allowed to enter the second display module 14 by setting the transmittance of the illuminating light to be transmitted to the target pixel (=row 4/column D) at the minimum level.

The brightness level at 12% of the full scale value corresponds to 30 LSB if image signals are expressed on an eight-bit full scale. It corresponds to 491 LSB if image signals are expressed on a 12-bit full scale.

In addition to the advantageous effects of the first embodiment, the second embodiment can achieve the following advantageous effects.

(1) When the target pixel and pixels continuous to the target pixel along the vertical direction and the horizontal direction are all to be rendered black (the brightness average value among the nine pixels is 0) in the display screen at the second display module 14, the quantity of illuminating light to illuminate the target pixel at the second display module 14 is reduced. As a result, the occurrence of light leakage can be prevented over a range smaller than a black display pixel area (where the image is displayed at a brightness level equal to or less than a predetermined brightness level).

(2) When only a small number of pixels among the target pixel and the pixels continuous to the target pixel along the vertical and horizontal directions are to be rendered black in the display screen at the second display module 14 (the brightness average value among the nine pixels is greater than 0 and equal to or less than the predetermined threshold value), the quantity of illuminating light to illuminate the target pixel at the second display module 14 is reduced in steps, i.e., by the extent corresponding to the display brightness average value among the pixels. As a result, as the quantity of illuminating light is altered gradually in a boundary area between a light area and a dark area in the display image, the light/dark boundary is made to look natural to the observer of the image.

(3) Since the quantity of illuminating light to illuminate an area constituting a light/dark boundary in the display image is reduced, any light leaking into the area where the illuminating light quantity must be reduced from a brightly illuminated area remains less noticeable. This means that the first display module 13 and the second display module 14 can be set one on top of another with less rigorous assembly accuracy (pixel alignment accuracy).

(4) When even fewer pixels among the target pixel and the pixels continuous to the target pixel along the vertical and horizontal directions are to be rendered black in the display screen at the second display module 14 (the brightness average value among the nine pixels exceeds the predetermined threshold value), the quantity of illuminating light to illuminate the target pixel at the second display module 14 is not reduced at all. Thus, pixels present in a light area and at a boundary of the light area in the display image are brightly illuminated. In other words, the brightness in the area to be rendered light (i.e., a display area with the brightness exceeding the predetermined brightness level) remains intact.

The threshold value in reference to which the transmittance of the illuminating light through the first display module 13 is switched as described above does not need to be 12%, and the threshold value may assume another value, e.g., 10% or 18%, as necessary.

(Variation 2)

Figure 7:
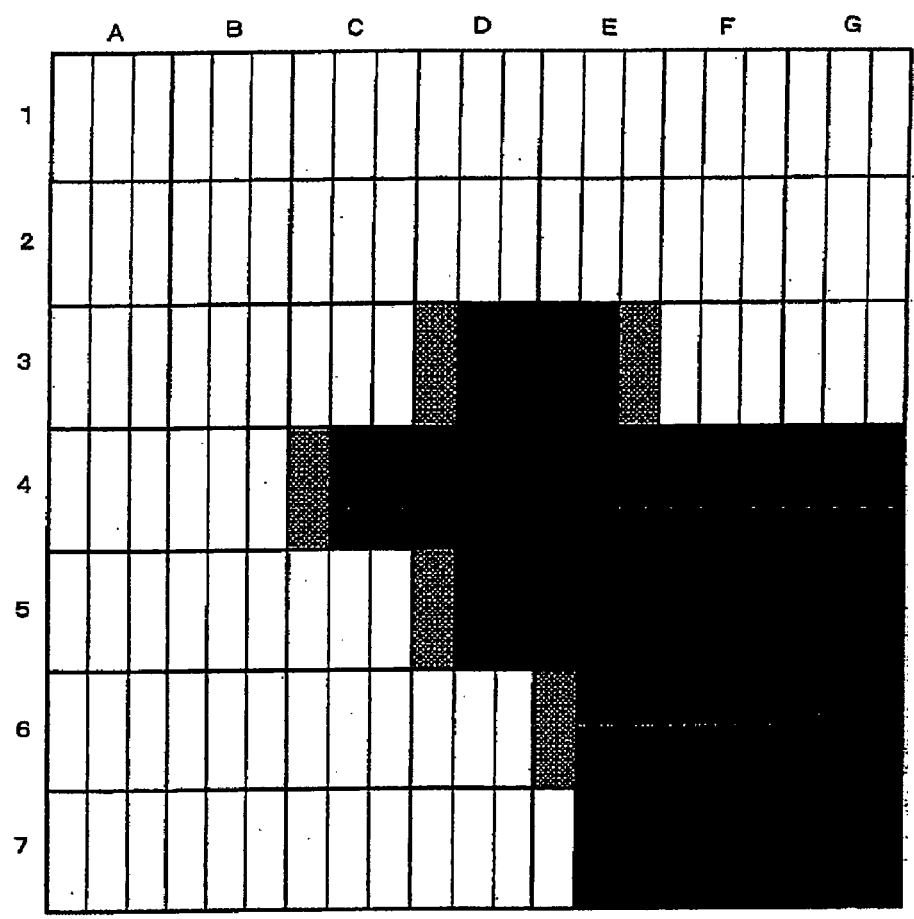

The quantity of illuminating light to enter the second display module 14 may be adjusted in correspondence to each sub-pixel assuming a specific color among the R, G and B colors. FIG. 7 shows specific areas divided in a matrix pattern at such a TN liquid crystal panel 13*c*. FIG. 7 shows pixels at the liquid crystal panel 13*c*, each disposed in correspondence to one of the sub-pixels at the second display module 14 shown in FIG. 6(*a*). The quantity of illuminating light to enter the second display module 14 can be adjusted in units of the individual sub-pixels.

In addition, the display device 100 reduces the extent of light leakage in a low-brightness area in the image being viewed by attenuating via the first display module 13 the light from the white LED 11, in correspondence to image signals supplied thereto, as described below.

When the R pixel taking up position row 2/column D in FIG. 6(*a*) is the target pixel, the display device 100 calculates a brightness level average value by using all the data in the image signals held in the nine pixels present within a three pixel (horizontal)×three pixel (vertical) range centered around the target pixel. In this case, there are four pixels each to be rendered in a bright color (in one of the R color, the G color and the B color) and five pixels to remain uncolored, and, accordingly, assuming that the brightness at a colored image area is 1, the brightness average value is calculated to be (1 (colored)×4+0 (uncolored)×5)/9=0.44. Since this average value exceeds the predetermined threshold value (e.g., 12% of the full scale value), no voltage is applied to the matrix area (through which the illuminating light is transmitted to the target pixel) at the liquid crystal panel 13*c* corresponding to the target pixel (at row 2/column D). Namely, if the average value of the brightness levels at the target pixel and the surrounding pixels exceeds 12% of the full scale value, the transmittance of the illuminating light at the first display module 13 over the area corresponding to the target pixel is set to the maximum level so as to maximize the quantity of illuminating light to enter the second display module 14 through this area.

When the R pixel taking up position row 3/column D in FIG. 6(*a*) is the target pixel, the display device 100 calculates a brightness level average value by using all the data in the image signals held in the nine pixels present within the three pixel (horizontal)×three pixel (vertical) range centered around the target pixel. In this case, there is one pixel to be rendered as a bright color (in one of the R color, the G color and the B color) and eight pixels to remain uncolored. Accordingly, assuming that the brightness at a colored image area is 1, the brightness average value is calculated to be (1 (colored)×1+0 (uncolored)×8)/9=0.11. When the average value of the brightness levels at the target pixel and the surrounding pixels is less than 12% of the full scale value, as in this case, a voltage is applied to the corresponding matrix area at the liquid crystal panel 13*c* so as to gradually lower the transmittance of the illuminating light to be transmitted to the target pixel (the R pixel at row 3/column D) by an extent corresponding to the brightness level average value.

When the R pixel taking up position row 4/column D in FIG. 6(*a*) is the target pixel, the display device 100 calculates a brightness level average value by using all the data in the image signals held in the nine pixels present within the three pixel (horizontal)×three pixel (vertical) range centered around the target pixel. In this case, there are no pixels to be rendered as bright colors (in any of the R color, the G color and the B color) and nine pixels to remain uncolored, and, accordingly, assuming that the brightness at a colored image area is 1, the brightness average value is calculated to be (1 (colored)×0+0 (uncolored)×9)/9=0. When the average value of the brightness levels at the target pixel and the surrounding pixels is equal to 0, as in this case, a voltage is applied to the corresponding matrix area at the liquid crystal panel 13*c* so as to ensure that substantially no illuminating light is allowed to enter the second display module 14 by setting the transmittance of the illuminating light to be transmitted to the target pixel (the R pixel at row 4/column D) at the minimum level.

By adopting the structure of variation 2 explained above, superfine light leakage preventive control can be executed as summarized below.

(1) When the target pixel and pixels continuous to the target pixel along the vertical direction and the horizontal direction are all to remain uncolored (the brightness average value among the nine pixels is 0) in the display screen at the second display module 14, the quantity of illuminating light to illuminate the target pixel at the second display module 14 is reduced. As a result, the occurrence of light leakage can be prevented over a range smaller than a pixel area to remain uncolored (where the image is displayed at a brightness level equal to or less than a predetermined brightness level).

(2) When only a small number of pixels among the target pixel and the pixels continuous to the target pixel along the vertical and horizontal directions are to remain uncolored in the display screen at the second display module 14 (the brightness average value among the nine pixels is greater than 0 and equal to or less than the predetermined threshold value), the quantity of illuminating light to illuminate the target pixel at the second display module 14 is reduced in steps, i.e., by the extent corresponding to the display brightness average value among the pixels. As a result, the light/dark boundary is made to look natural to the observer of the image.

(3) Since the quantity of illuminating light to illuminate an area constituting a light/dark boundary in the display image is reduced, any light leaking into the area where the illuminating light quantity must be reduced from a brightly illuminated area remains less noticeable. This means that the first display module 13 and the second display module 14 can be set one on top of another with less rigorous assembly accuracy (pixel alignment accuracy).

(4) When even fewer pixels among the target pixel and the pixels continuous to the target pixel along the vertical and horizontal directions are to remain uncolored in the display screen at the second display module 14 (the brightness average value among the nine pixels exceeds the predetermined threshold value), the quantity of illuminating light to illuminate the target pixel at the second display module 14 is not reduced at all. Thus, the brightness in the area to be rendered light (i.e., a display area with the brightness exceeding the predetermined brightness level) remains intact.

In the explanation provided above, the transmittance for the illuminating light to illuminate the target pixel is determined based upon the average value of the brightness values indicated at the target pixel and the pixels surrounding the target pixel. The range of pixels, the brightness values of which are used when calculating the brightness average value, may be adjusted as necessary. In addition, instead of calculating the brightness average value through simple averaging, as explained above, the average value may be calculated through weighted averaging.

Figure 8:
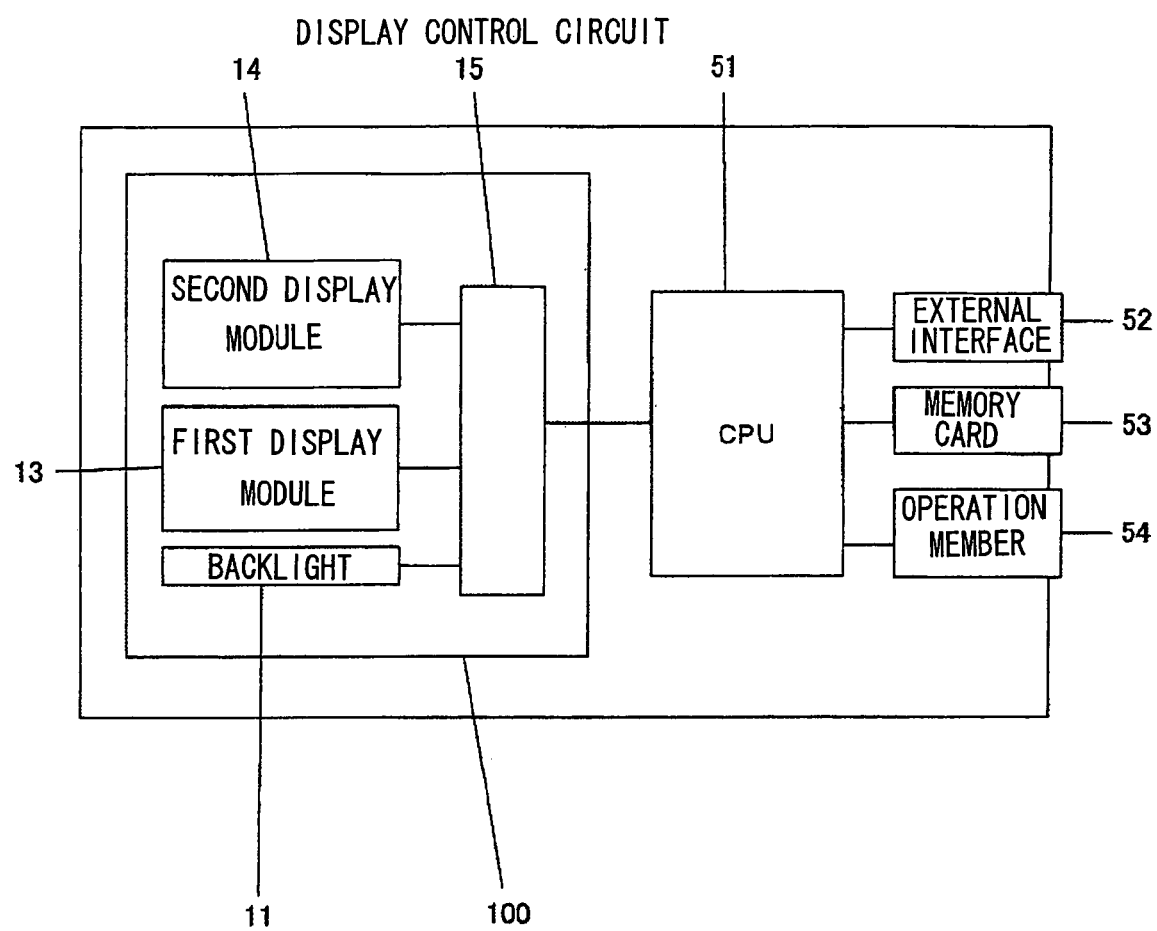

FIG. 8 shows a photo viewer representing an example of an electronic apparatus that may be equipped with the display device 100 described above. The photo viewer engages the display device 100 to display an image reproduced based upon image data. The display image may be a specific image recorded in a memory card 53 (e.g., an image specified in advance by an operation signal originating from an operation member 54), an image selected by a CPU 51 from images recorded in the memory card 53, or an image constituted with image data provided from an external device via an external interface 52.

The CPU 51 executes specific arithmetic operation and the like based upon a control program by using signals input thereto from various components in the photo viewer and controls image display operation by outputting to the individual components of the photo viewer control signals generated through the arithmetic operation. It is to be noted that the control program is stored in a non-volatile memory (not shown) installed in the CPU 51.

An operation member 54 outputs an operation signal corresponding to a user operation to the CPU 51. Data can be written into, saved in and read from the memory card 53 constituted with a nonvolatile memory such as a flash memory in response to commands issued by the CPU 51. In response to a command issued by the CPU 51, the external interface 52 carries out communication with an external apparatus such as an electronic camera or a personal computer. Image signals received through such communication are then input to the CPU 51.

A display control circuit 15 generates signals to be used to drive the second display module 14 and the first display module 13 in correspondence to image signals output from the CPU 51 and individually drives the second display module 14 and the first display module 13 with the drive signals thus generated.

The display control circuit 15 also turns on a backlight 11 at a specified brightness level in response to an ON instruction output from the CPU 51. The backlight 11 having been turned on illuminates the second display module 14 via the first display module 13.

An image reproduced based upon image data recorded in the memory card 53 is displayed at the display device 100 in the photo viewer described above as the CPU 51 reads out the image data from the memory card 53, generates display data corresponding to the number of display pixels at the display device 100 by using the image data having been read out and provides the display data thus generated to the display control circuit 15 as image signals. It also issues a backlight ON instruction to the display control circuit 15. The display data include brightness level information indicating the brightness level at each pixel in the second display module 14. The display control circuit 15 determines the transmittance of the illuminating light to be transmitted through the first display module 13, i.e., the illuminating light quantity reduction rate, based upon the brightness level information included in the display data and controls the illuminating light quantity accordingly.

While the TN-type liquid crystal panel 13c (13d) is used as the light adjustment element which controls the quantity of transmitted light in correspondence to each of the specific areas present within the effective display area 100a, a polymer network liquid crystal, an electro-chromatic element or the like may be utilized instead of a monochrome liquid crystal display element such as that explained in reference to the embodiment.

The display device 100 may be mounted in an electronic apparatus with a display screen, such as a digital camera, an electronic book viewer, a photo viewer, a computer monitor, a video monitor or a television set.

Third Embodiment

Figure 9:
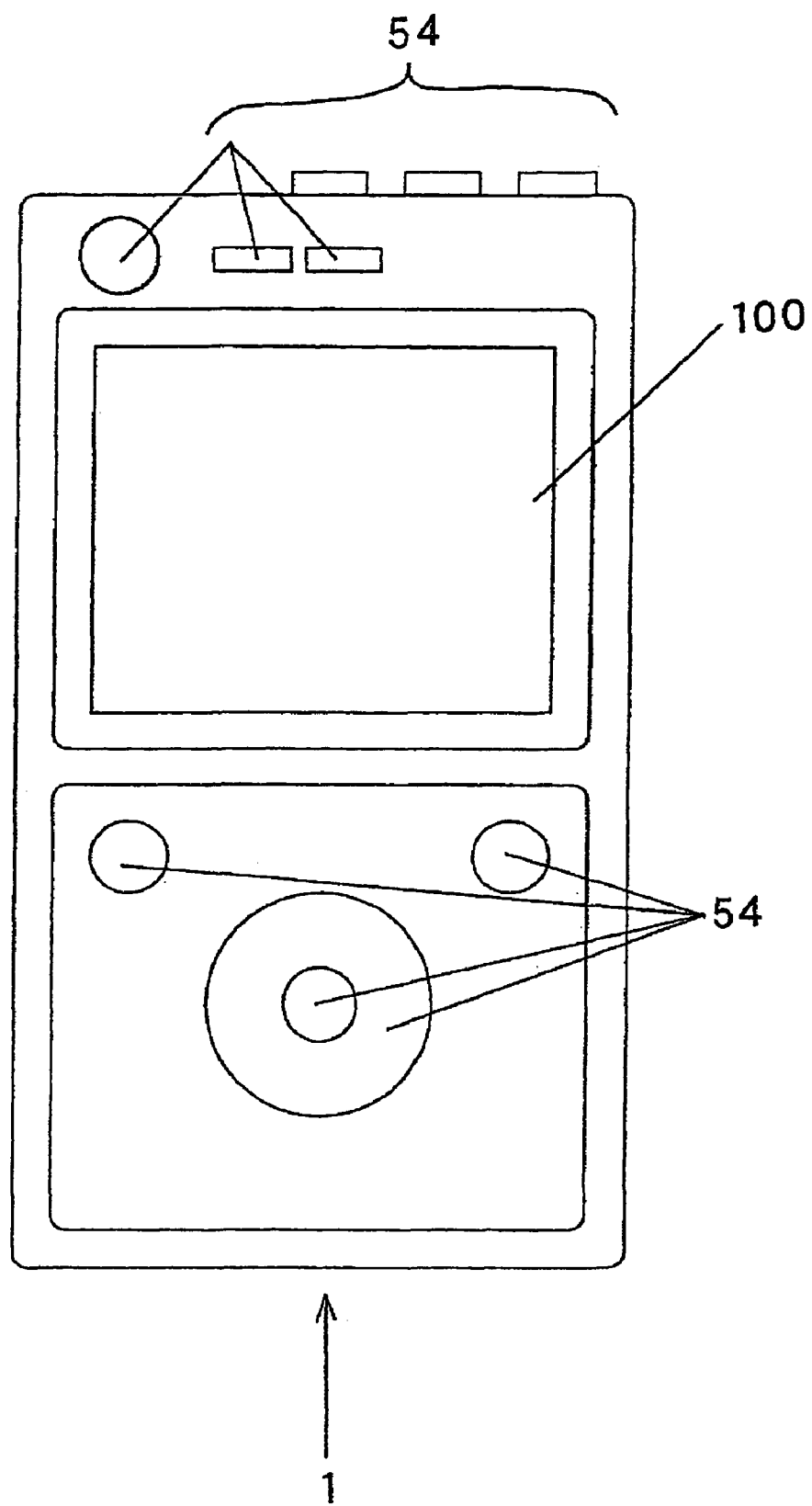

FIG. 9 shows a photo viewer 1 achieved in the third embodiment of the present invention. The photo viewer 1 engages a display device 100 to display an image reproduced based upon image data. The display image may be an image recorded in a recording medium such as a memory card or an image provided to the photo viewer 1 from an external apparatus via an interface. A display image selection instruction and the like for the photo viewer 1 are input by operating operation members 54.

Figure 10:
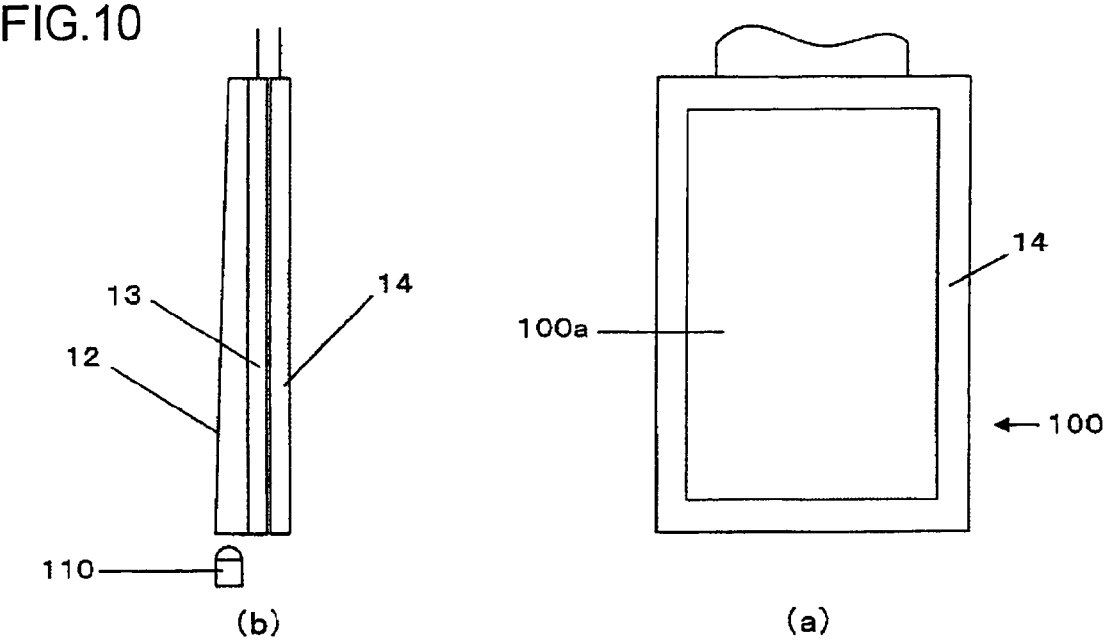

FIGS. 10(a) and 10(b) illustrate the structure adopted in the display device 100 to be installed in the photo viewer 1. FIG. 10(a) shows the display device in a front view, whereas FIG. 10 (b) shows the display device in a side elevation. At the display device 100 shown in FIG. 10(a), an image, text or the like is brought up on display within an effective display area 100a.

Since the display device 100 in FIGS. 10(a) and 10(b) is basically identical to that achieved in the first and second embodiments described above, a detailed explanation is omitted. However, the brightness level with which light is emitted as a high-brightness white LED 110 constituting the backlight member together with a light guide plate 12 is turned on changes in correspondence to the level of a drive current supplied from a control circuit to be detailed later. The brightness of the emitted light can be adjusted between, for instance, high level (maximum brightness level) and normal level (normal brightness level) which is ¼ the high level.

Figure 11:
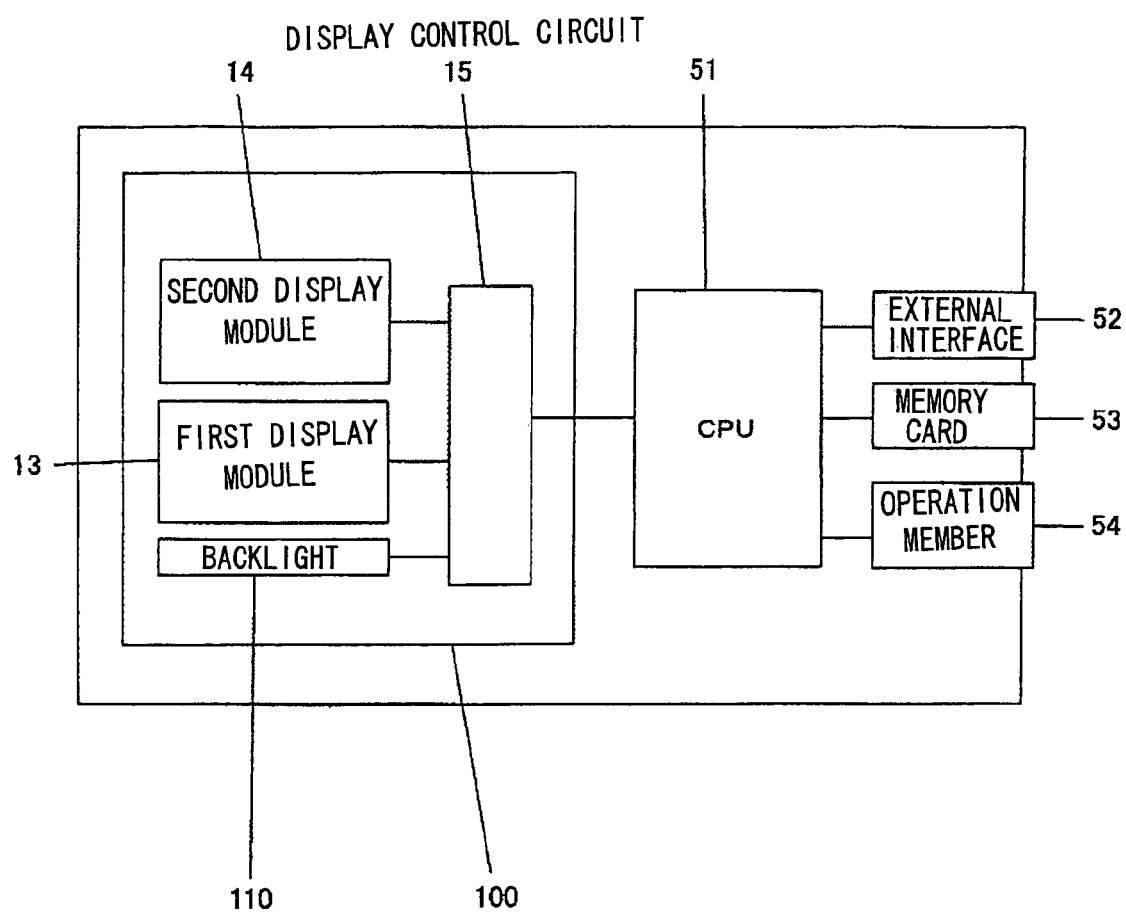

FIG. 11 is a block diagram of the essential structure adopted in the photo viewer 1 in FIG. 9. A specific image recorded in a memory card 53 (e.g., an image pre-specified by an operation signal originating from an operation member 54), an image selected by the CPU 51 from images recorded in the memory card 53 or an image provided from an external apparatus via an external interface 52 is reproduced and displayed at the display device 100 in the photo viewer 1.

A CPU 51 executes specific arithmetic operations and the like based upon a control program by using signals input thereto from various components in the photo viewer 1 and controls image display operations by outputting to the individual components of the photo viewer 1 control signals generated through the arithmetic operations. It is to be noted that the control program is stored in a non-volatile memory (not shown) installed in the CPU 51.

An operation member 54 outputs operation signals corresponding to user operations to the CPU 51. Data can be written into, saved in and read from the memory card 53 constituted with a nonvolatile memory such as a flash memory in response to commands issued by the CPU 51. In response to a command issued by the CPU 51, the external interface 52 carries out communication with an external apparatus such as an electronic camera or a personal computer. Image signals received through such communication are then input to the CPU 51.

A display control circuit 15 generates signals to be used to drive the second display module 14 and the first display module 13 in correspondence to display data output from the CPU 51 and individually drives the second display module 14 and the first display module 13 with the drive signals thus generated.

The display control circuit 15 also turns on the backlight 110 at a specified brightness level in response to an ON instruction output from the CPU 51. The backlight 110 having been turned on illuminates the second display module 14 via the first display module 13.

An image reproduced based upon image data recorded in the memory card 53 is displayed at the display device 100 in the photo viewer 1 described above as the CPU 51 reads out the image data from the memory card 53, generates display data corresponding to the number of display pixels at the display device 100 by using the image data having been read out and provides the display data thus generated to the display control circuit 15 as image signals. It also issues a backlight ON instruction to the display control circuit 15. The display data include brightness level information indicating the brightness level at each pixel in the second display module 14. The display control circuit 15 determines the transmittance of the illuminating light to be transmitted through the first display module 13, i.e., the illuminating light quantity reduction rate, based upon the brightness level information included in the display data and controls the illuminating light quantity accordingly.

(Display Modes Available at the Display Device)

The display device 100, which minimizes the extent of light leakage as explained earlier, also allows display mode changeover among the following three display modes. The display mode is switched by the display control circuit 15 in response to a changeover instruction issued by the CPU 51 by controlling the brightness level with which the backlight 110 is turned on and the transmittance of the illuminating light through the first display module 13.

(A) Normal Display Mode

In the normal display mode, the backlight 110 is turned on with the normal brightness level (¼ of the maximum ON brightness), the light leakage inhibiting function is turned off and the transmittance of the illuminating light is set to the highest level for all the pixels at the first display module 13. The upper limit of the gradation expressed at the display device 100 under these circumstances is equivalent to the level of illuminating light initially emitted from the backlight 110 with the normal brightness level, transmitted through the first display module 13 at which the transmittance is set to the highest level and then transmitted through the second display module 14 at which the transmittance is set at the highest level (for the white display). The lower limit of the gradation expressed at the display device 100 under the same circumstances is equivalent to the level of illuminating light initially emitted from the backlight 110 with the normal brightness level, transmitted through the first display module 13 at which the transmittance is set to the highest level and then transmitted through the second display module 14 at which the transmittance is set at the lowest level (for the black display).

(B) First High-quality Image Display Mode

In the first high-quality image display mode, the backlight 110 is turned on with brightness twice the normal level (½ of the maximum ON brightness), the light leakage inhibiting function is turned off and the transmittance of the illuminating light is set to the highest level for all the pixels at the first display module 13. The upper limit of the gradation expressed at the display device 100 under these circumstances is equivalent to the level of illuminating light initially emitted from the backlight 110 with brightness twice the normal level, transmitted through the first display module 13 at which the transmittance is set to the highest level and then transmitted through the second display module 14 at which the transmittance is set at the highest level (for the white display). The lower limit of the gradation expressed at the display device 100 under the same circumstances is equivalent to the level of illuminating light initially emitted from the backlight 110 with brightness twice the normal level, transmitted through the first display module 13 at which the transmittance is set to the highest level and then transmitted through the second display module 14 at which the transmittance is set at the lowest level (for the black display). While the first high-quality image display mode assures a display dynamic range equivalent to that of the normal display mode, the brightness of the image displayed in the first high-quality image display mode is improved over that in the normal display mode.

(C) Second High-quality Image Display Mode

In the second high-quality image display mode, the backlight 110 is turned on with the high brightness level (maximum ON brightness=4 times the normal brightness level) and the transmittance of the illuminating light through the first display module 13 is controlled in correspondence to the brightness level indicated in the display data (the light leakage inhibiting function is turned on). The upper limit of the gradation expressed at the display device 100 under these circumstances is equivalent to the level of illuminating light initially emitted from the backlight 110 with brightness four times the normal level, transmitted through the first display module 13 at which the transmittance is set to the highest level and then transmitted through the second display module 14 at which the transmittance is set at the highest level (for the white display). The lower limit of the gradation expressed at the display device 100 under these circumstances is equivalent to the level of illuminating light initially emitted from the backlight 110 with brightness four times the normal level, transmitted through the first display module 13 at which the transmittance is set to the lowest level (for inhibiting light leakage) and then transmitted through the second display module 14 at which the transmittance is set at the lowest level (for the black display). The brightness of the image displayed in the second high-quality image display mode is improved (the upper limit of the gradation is raised) over that achieved in the first high-quality image display mode and, at the same time, the second high-quality image display mode assures a greater display dynamic range since the lower limit of the gradation is lowered as well.

(Partial High-quality Image Display)

The photo viewer 1 in the third embodiment displays an image over part of the display screen at the display device 100 in (C) the second high-quality image display mode and displays an image over the remaining part of the display screen with a display dynamic range and a level of brightness both similar to those of (A) normal display mode.

FIGS. 12(*a*) and 12(*b*) present an example of an image that may be displayed at the display device 100 in the photo viewer 1. FIG. 12(*a*) shows an image formed via the second display module 14, whereas FIG. 12(*b*) shows an image formed via the first display module 13. As explained earlier, the image in FIG. 12(*a*), illuminated with the illuminating light transmitted with the illuminating light pattern shown in FIG. 12(*b*), is viewed by the user.

FIG. 12(*a*) shows a reproduced display image 61 displayed on the right side of the screen and information (Exif information) appended to the data of the reproduced image displayed as text information in a blank area 62 on the left side of the reproduced display image. In the example presented in FIG. 12(*a*), the image data file name "XXXX YYYY", the image data recording format "JPEG (Normal)", the number of pixels "1600×1200", the photographing date "200x.x.x" and photographing conditions such as the shutter speed and the aperture value "1/30 sec F/2.6" are displayed as the Exif information. The items of data to be displayed as the Exif information can be switched as necessary through an operation of an operation member 54.

The user operates an operation member 54 while viewing the image and the information related to the image displayed at the display device 100 to issue an instruction for switching the display image, for bringing up a full screen display (displaying the image alone over the entire screen without displaying the Exif information) or for displaying the image together with the Exif information.

In response to an operation signal input to the CPU 51 from an operation member 54 instructing that the image be displayed together with the Exif information, the CPU 51 outputs a command for the displayed control circuit 15 so as to set the ON brightness at the backlight 110 to high level (quadruple brightness level). In addition, the CPU 51 controls the transmittance at the first display module 13 so as to uniformly reduce the brightness of the illuminating light to be used to illuminate the area other than the area over which the reproduced display image 61 is displayed on the second display module 14 to ¼ and also executes the light leakage inhibiting control explained earlier over the area corresponding to the reproduced display image 61 on the second display module 14.

In the example presented in FIG. 12(b), control is executed so that the quantity of light transmitted through an area 63 is ¼ of the light quantity corresponding to the maximum transmittance level, the quantity of light transmitted through an area 64 corresponds to the display brightness for the reproduced display image 61 (see FIG. 12(a)) and that light is transmitted through an area 65 in the highest level (i.e., at the maximum transmittance level). As a result, the user is able to view the reproduced display image 61 displayed with the wide dynamic range achieved in (C) second high-quality image display mode and the Exif information 62 displayed with the normal brightness as in (A) normal display mode described.

(Full Screen Display)

In response to an operation signal input thereto from an operation member 54 instructing that a full screen display be brought up, the CPU 51 outputs a command for the display control circuit 15 so as to set the ON brightness at the backlight 110 to high level (quadruple brightness). In addition, the CPU 51 first adjusts the transmittance at the first display module 13 to the maximum level so as to maximize the brightness of the illuminating light used to illuminate the entire display screen of the second display module 14 and then executes the light leakage inhibiting control explained earlier. As a result, the user is able to view the reproduced display image displayed with the wide dynamic range achieved in (C) second high-quality image display mode.

The following advantageous effects can be achieved in the third embodiment described above;

(1) The display device 100 in the photo viewer 1 allows the user to select any display mode among the three different display modes, (A) normal display mode, (B) first high-quality image display mode and (C) second high-quality image display mode. As a result, a display can be brought up with the brightness level and the dynamic range corresponding to the user's preference. In (A) normal display mode, only a small electric current is required at the backlight 110 and thus, the power consumption is reduced. In addition, since the display is not too bright, it can be viewed with ease. In (A) normal display mode and (B) first high-quality image display mode, the illuminating light transmittance can be fixed at the maximum level uniformly over the entire display area at the first display module 13, and thus only simple control needs to be executed.

(2) When displaying the image together with the Exif information at the display device 100 of the photo viewer 1, only the image is displayed in the high-quality image display mode so as to allow the user to view the image displayed with the high level of brightness and the wide dynamic range. Display is brought up over the area other than the image area, where the Exif information is displayed, as in the normal display mode, ensuring that the visibility of the character information is not compromised due to excessively high background brightness, e.g., black characters displayed against a white background. Since the illuminating light transmittance over the area 63 on the first display module 13 only needs to be fixed to ¼ of the maximum transmittance level, the control is simplified.

The threshold value at which the transmittance of illuminating light at the first display module 13, i.e., the quantity of illuminating light to be transmitted through the first display module 13, is switched for purposes of preventing light leakage is not limited to 5%, as indicated in FIG. 3, and should be adjusted to the optimal value, e.g., 3% or 15%, as necessary.

Figure 13:
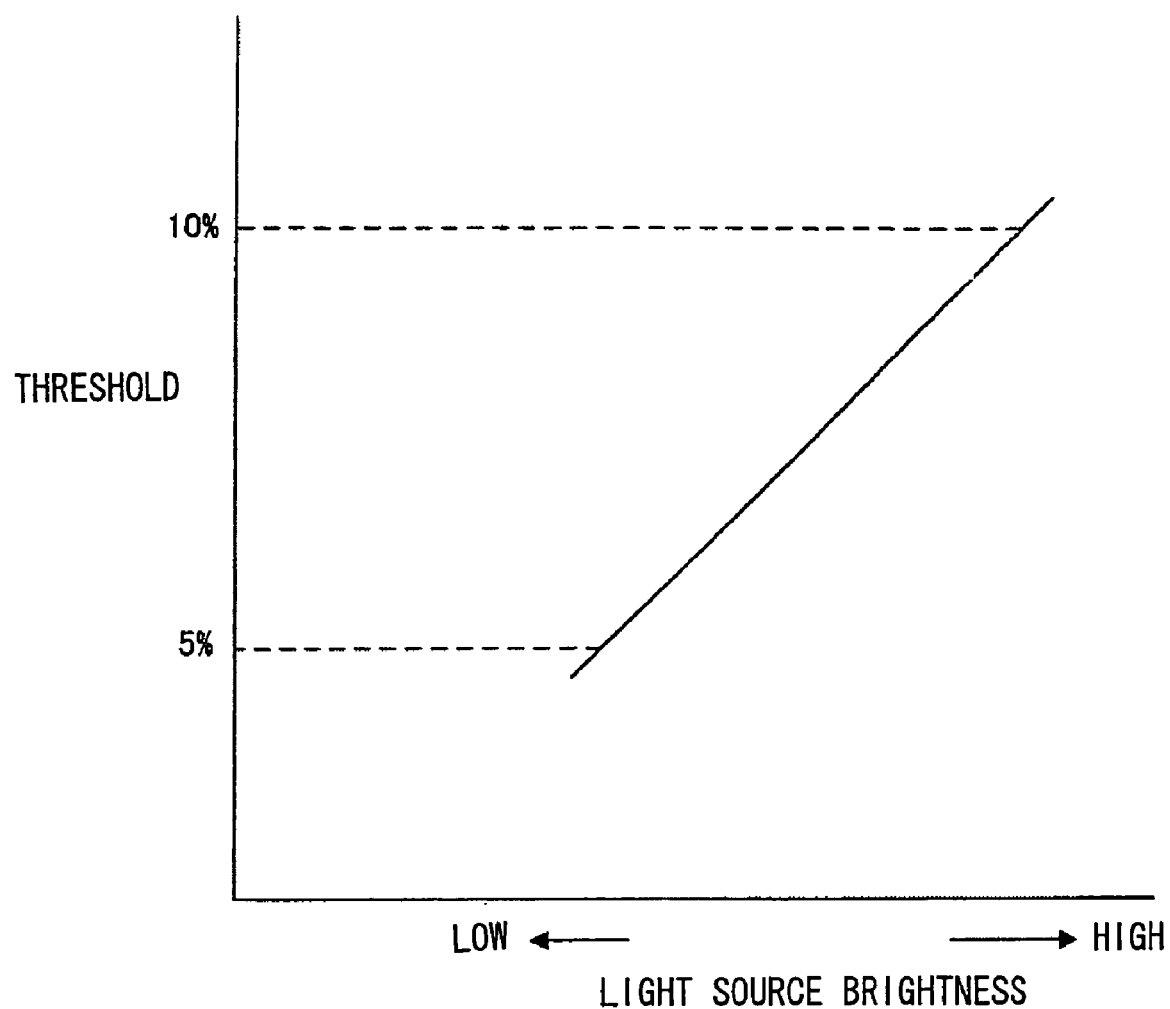

In addition, the threshold value may be varied in correspondence to the level of the brightness of the illuminating light provided via the backlight member (110, 12). FIG. 13 shows the relationship between the brightness of the illuminating light provided via the backlight member (110, 12) (light source brightness) and the threshold value. In FIG. 13, the light source brightness is indicated along the horizontal axis and the threshold value is indicated along the vertical axis.

FIG. 13 indicates that a higher threshold value is set as the light source brightness increases, within an approximate range of, for instance, 5%~10% of the full scale, in proportion to the increase in the light source brightness. In this case, the absolute value of the transmitted light in the R, G and B colors transmitted through an area to be rendered dark in the display screen (i.e., an area in correspondence to which the transmittance is set to the lowest level at the liquid crystal panel 14c constituting the second display module 14) can be minimized even when the light source brightness is high. Thus, the user cannot detect any light leakage in the image he is observing in spite of the high light source brightness.

Fourth Embodiment

Figure 14:
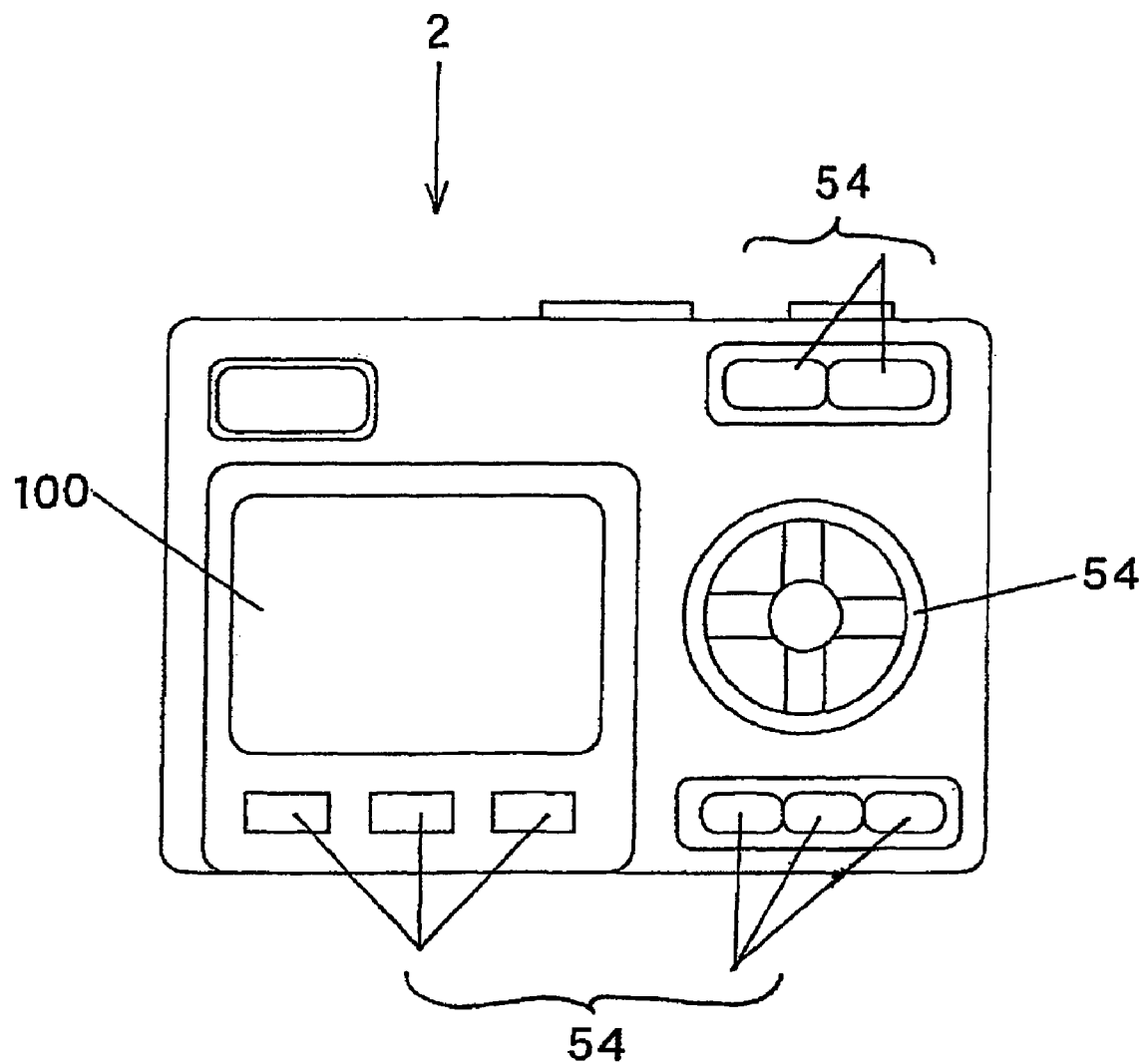

FIG. 14 illustrates an electronic camera 2 achieved in the fourth embodiment of the present invention. The electronic camera 2 includes a display device 100 at which a preview image (through image) is displayed prior to a photographing operation, a monitor image (freeze image) is displayed following the photographing operation, a reproduced image reproduced based upon data recorded in a memory card or the like is displayed or a setting menu is displayed. An instruction for switching the electronic camera 2 to a photographing mode, a reproduction mode or a setting menu mode, a photographing instruction, an instruction for selecting a specific image for reproduction and the like are input by operating an operation member 54.

Figure 15:
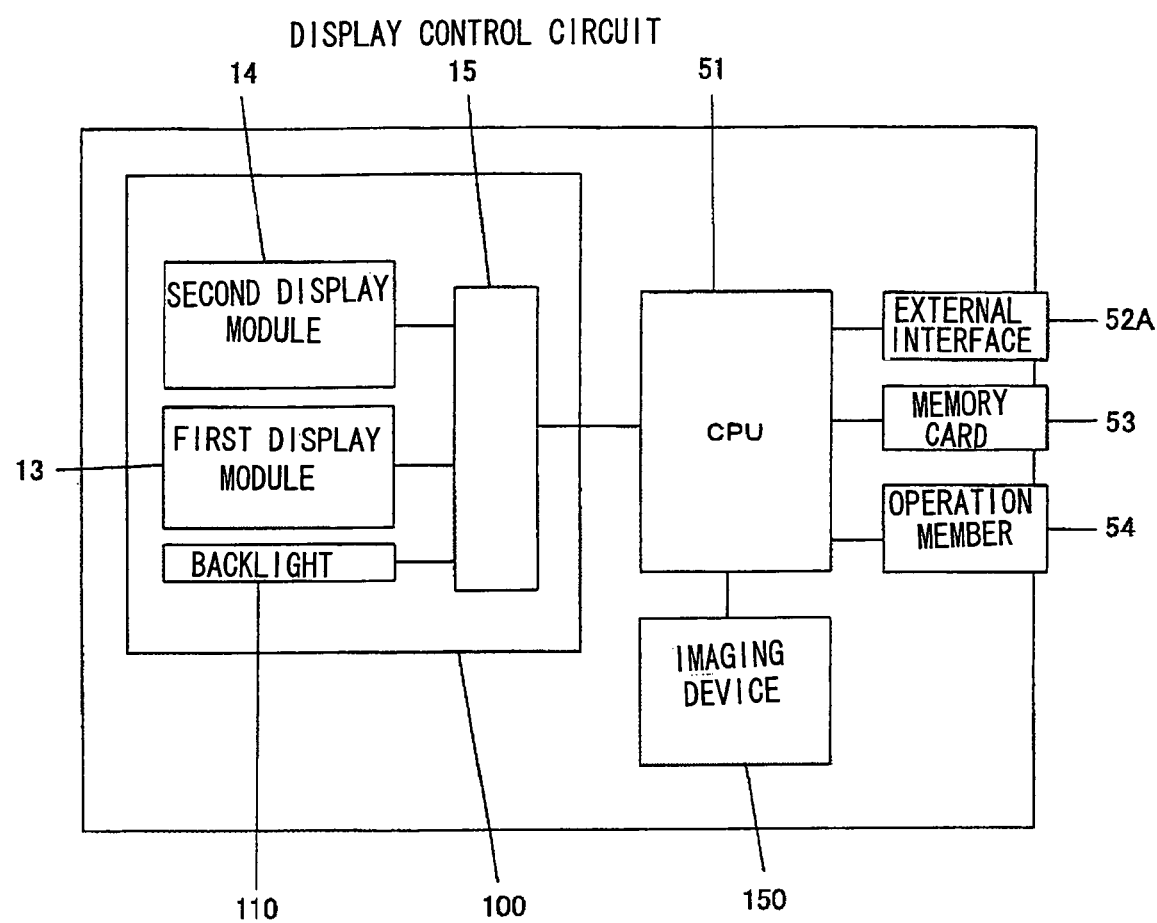

FIG. 15 is a block diagram of the essential structure adopted in the electronic camera 2 in FIG. 14. A CPU 51 executes specific arithmetic operations and the like based upon a control program by using signals input thereto from various units in the electronic camera 2 and controls photographing operations, auto focus adjustment operations and image display operations by outputting control signals resulting from the arithmetic operations to the individual units constituting the electronic camera 2. It is to be noted that the control program is stored in a non-volatile memory (not shown) in the CPU 51.

An operation member 54 outputs an operation signal corresponding to a user operation to the CPU 51. Data can be written into, saved in and read from a memory card 53 constituted with a nonvolatile memory such as a flash memory in response to commands issued by the CPU 51. In response to a command issued by the CPU 51, an external interface 52A carries out communication with an external apparatus such as a personal computer.

An imaging device 150 includes an imaging element constituted with a CCD image sensor, a CMOS image sensor or the like and captures a subject image in response to a command output by the CPU 51. The imaging device 150 also executes a specific type of signal processing on imaging signals, converts data resulting from the signal processing to image data in a predetermined format and outputs the image data resulting from the conversion to the CPU 51.

Since the display device 100 is similar to that installed in the photo viewer 1 in the third embodiment, a detailed explanation thereof is omitted. The display device 100 mounted at the electronic camera 2, too, allows display mode changeover among (A) normal display mode, (b) first high-quality image display mode and (C) second high-quality image display mode.

The electronic camera 2 switches the display at the display device 100 to a specific display mode among (A) normal display mode, (B) first high-quality image display mode and (C) second high-quality image display mode in correspondence to the selected operation mode.

(Photographing Mode and Setting Menu Mode)

In response to an operation signal input thereto from an operation member 54 specifying either the photographing mode or the setting menu mode to be set for the electronic camera 2, the CPU 51 outputs a command for the display control circuit 15 so as to set the brightness level at the backlight 110 to normal (normal brightness). In addition, the CPU 51 uniformly adjusts the transmittance at the first display module 13 to the maximum transmittance level so as to maximize the illuminating light brightness over the entire display area on the second display module 14 and then turns off the light leakage inhibiting function. As a result, the user is able to view a reproduced display image (through image or freeze image) or the setting menu screen displayed in (A) normal display mode.

(Focus Check in Photographing Mode)

In response to an operation signal input thereto from an operation member 54 instructing that the focus be checked in the photographing mode, the CPU 51 outputs a command for the display control circuit 15 so as to set the ON brightness at the backlight 110 to high level (quadruple brightness). In addition, the CPU 51 controls the transmittance at the first display module 13 so as to uniformly reduce the brightness of the illuminating light, to be used to illuminate the area other than the area corresponding to the focus area on the second display module 14, to ¼ and also executes the light leakage inhibiting control explained earlier over the area corresponding to the focus area on the second display module 14. From the focus area set within the photographic image plane, focus adjustment information to be used in auto focus adjustment is obtained, and it is assumed that the focus area is set at the center of the photographic image plane in the embodiment. The CPU 51 calculates a lens drive quantity indicating the extent to which the lens is to be driven based upon the focus adjustment information having been obtained and issues an instruction for a lens drive mechanism (not shown) to drive the focus lens by the extent corresponding to the lens drive quantity. Auto focus adjustment is thus executed.

FIGS. 16(*a*) and 16(*b*) present an example of an image that may be displayed at the display device 100 in the electronic camera 2 in response to a focus check instruction. FIG. 16(*a*) shows an image formed via the second display module 14, whereas FIG. 16(*b*) shows an image formed via the first display module 13. The image in FIG. 16(*a*), illuminated with the illuminating light transmitted with the illuminating light pattern shown in FIG. 16(*b*), is viewed by the user.

In the example presented in FIG. 16(*b*), control is executed so that the quantity of light transmitted through an area 73 surrounding the focus area is ¼ of the light quantity corresponding to the maximum transmittance level, the quantity of light transmitted through an area 74 corresponds to the display brightness for a display image 71 (see FIG. 16(*a*)) corresponding to the focus area and that the light transmitted through an area 75 is in the largest quantity (i.e., at the maximum transmittance level). As a result, the user is able to view the display image 71 corresponding to the focus area as an image displayed with the wide dynamic range achieved in (C) second high-quality image display mode. The image displayed over the area other than the focus area can be viewed as an image displayed with the normal brightness level as in (A) normal display mode.

(Reproduction Mode)

In response to an operation signal input thereto from an operation member 54 specifying the reproduction mode to be set for the electronic camera 2, the CPU 51 outputs a command for the display control circuit 15 so as to set the ON brightness at the backlight 110 to a brightness twice the normal brightness level (½ of the maximum ON brightness). In addition, the CPU 51 uniformly adjusts the transmittance at the first display module 13 to the maximum transmittance level so as to maximize the illuminating light brightness over the entire display area on the second display module 14 and then turns off the light leakage inhibiting function. As a result, the user is able to view a reproduced display image displayed in (B) first high-quality image display mode.

Figure 17:
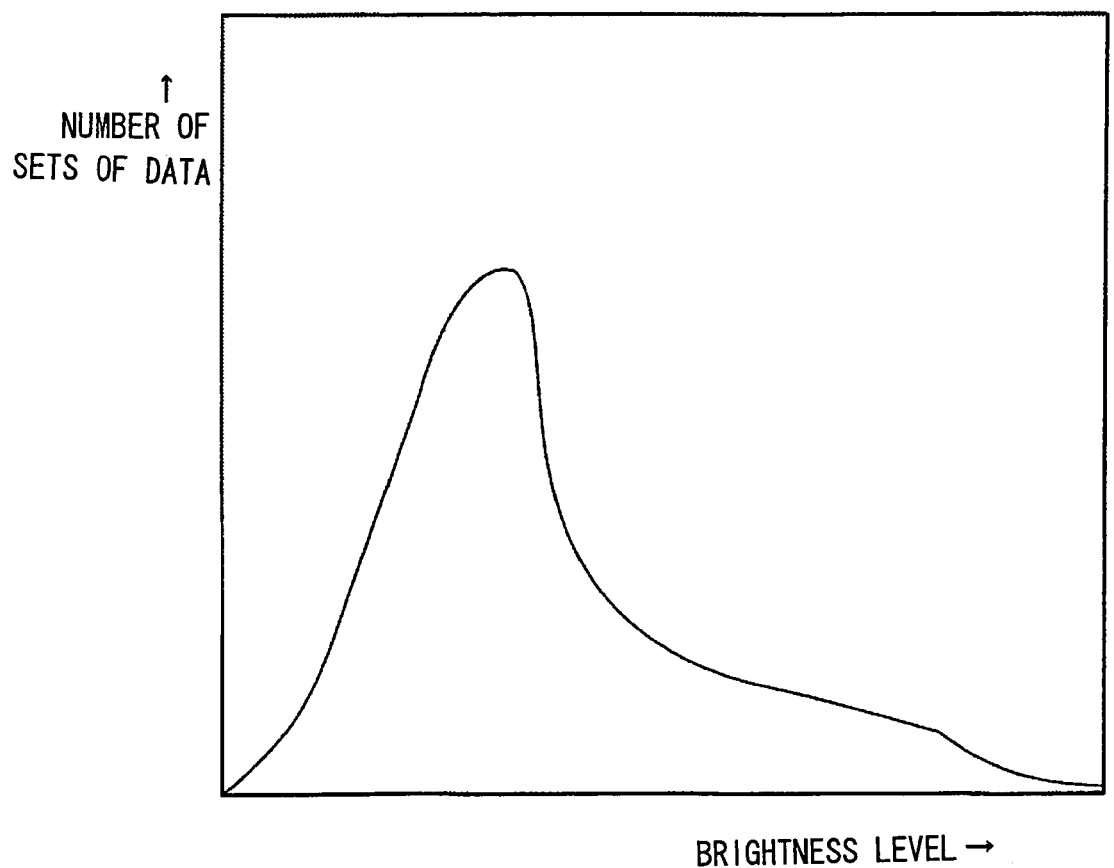
Figure 18:
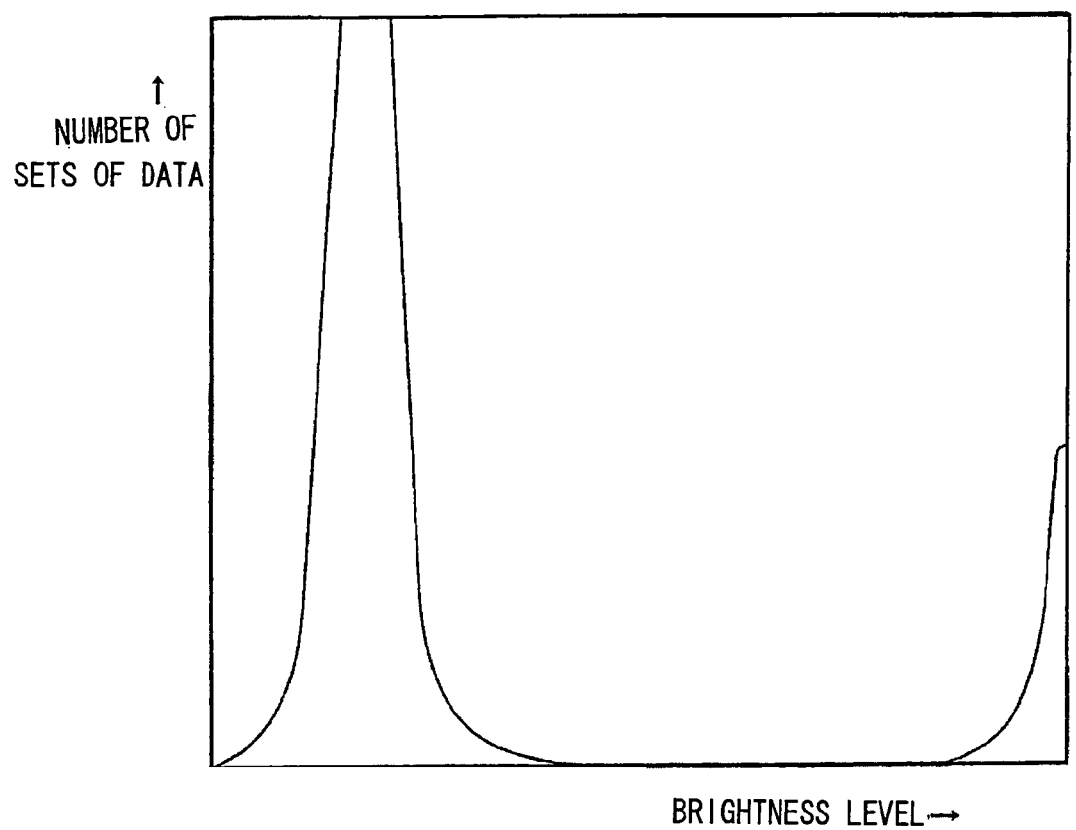

Furthermore, the CPU 51 analyzes the brightness distribution indicated by the image signals provided to the display device 100. FIGS. 17 and 18 each present an example of a histogram indicating a brightness distribution. FIG. 17 shows the brightness distribution in an image photographed with front lighting, whereas FIG. 18 shows the brightness distribution of an image photographed with back lighting. In FIGS. 17 and 18, the brightness indicated at the pixels constituting the image are indicated along the horizontal axis and the frequency, i.e., the number of pixels (the number of sets of data) corresponding to each brightness level, is indicated along the vertical axis.

Generally speaking, an image photographed under front lighting with the optimal exposure contains a large number of sets of data over the halftone range but contains a small number of sets of high brightness data distributed over the right side in the histogram. An image photographed under back lighting, on the other hand, includes more high brightness data attributable to sunlight or the like and low brightness data distributed over the left side in the histogram.

The CPU 51 judges that the image has been photographed under back lighting if the histogram indicates that the number of sets of data indicating brightness levels equal to or lower than a predetermined low brightness level is equal to or higher than a predetermined value and that the number of sets of data indicating brightness levels equal to or higher than a predetermined high brightness level is equal to or greater than a predetermined value, whereas it determines the image has been photographed under front lighting if the number of pixels corresponding to the brightness level indicated at the right end of the histogram is less than the predetermined value.

Upon judging that the image has been photographed under back lighting, the CPU 51 outputs a command for the display control circuit 15 to set the ON brightness at the backlight 110 to high brightness level (quadruple brightness) so as to adjust the transmittance at the first display module 13 to uniformly maximize the brightness of the illuminating light used to illuminate the entire display screen at the second display module 14. In addition, the CPU 51 executes the light leakage inhibiting control explained earlier for the second display module 14. As a result, the user is able to view the reproduced display image displayed with the wide dynamic range achieved in (C) second high-quality image display mode.

It is to be noted that the histograms presented in FIGS. 17 and 18 represent examples of data, provided to facilitate the explanation and that it is not strictly necessary to prepare such histograms for the actual decision-making processing. For instance, the number of sets of data (the number of pixels) indicating brightness levels equal to or higher than a high brightness decision-making threshold value and the number of sets of data indicating brightness levels equal to or lower than a low brightness decision-making threshold value in the data constituting the image may be individually counted and a decision as to whether the image has been photographed under front lighting or back lighting may be made based upon these count values.

(Thumbnail Display in Reproduction Mode)

In response to an operation signal input thereto from an operation member 54 in instructing that thumbnails be displayed for a thumbnail check in the reproduction mode, the CPU 51 outputs a command for the display control circuit 15 to set the ON brightness at the backlight 110 to normal brightness level (normal brightness). In addition, the CPU 51 first adjusts the transmittance at the first display module 13 to the maximum level so as to maximize the brightness of the illuminating light used to illuminate the entire display screen at the second display module 14 and then turns off the light leakage inhibiting function. As a result, the user is able to view thumbnail images displayed in (A) normal display mode.

The following advantageous effects can be achieved in the fourth embodiment described above.

(1) As the electronic camera 2 is set in the photographing mode or the setting menu mode, the display is brought up at the display device 100 in (A) normal display mode. In other words, when the user needs to check the image composition by viewing a display image in the photographing mode or when the user only needs to check the menu contents in the setting menu mode, the optimal display mode is automatically selected. In (A) normal display mode, the control for the first display module 13 is simplified and the extent of power use at the backlight 110 is minimized. In addition, when black characters are displayed against a white background, the visibility of the character information is not compromised due to excessively high background brightness.

(2) In response to a focus check instruction issued in the photographing mode, the image area corresponding to the focus area alone is displayed in the high-quality image display mode. Thus, the image over the focus area is displayed with a higher level of brightness and a wider dynamic range than the rest of the image, facilitating the focus adjustment state verification.

(3) As the electronic camera 2 is set in the reproduction mode, the display at the display device 100 is brought up in (B) first high-quality image display mode. In other words, once the electronic camera 2 is set in the reproduction mode, the display mode ideal for photographic image viewing is automatically selected. In (B) first high-quality image display mode, are produced image displayed with high brightness can be viewed.

(4) If an image to be reproduced for display in the reproduction mode is judged to have been photographed under backlighting, the display at the display device 100 is switched to (C) second high-quality image display mode so as to allow the user to view a reproduced image displayed with a high level of brightness and a wide dynamic range. Unlike in (A) normal display mode and (B) first high-quality image display mode, the high brightness data and the low brightness data in the image having been photographed under back lighting can both be displayed with optimal representation in (C) second high-quality image display mode.

(5) In response to a thumbnail check instruction issued in the reproduction mode, the display at the display device 100 is switched to (A) normal display mode. Namely, in response to the thumbnail check instruction, the display mode optimal for thumbnail display is automatically selected. In (A), normal display mode described, the control for the first display module 13 is simplified and the extent of power use at the backlight 110 is minimized.

(Variation 3)

After the electronic camera is set in the reproduction mode, display at the display device 100 may first be briefly provided in (A) normal display mode. In such a case, the CPU 51 first displays a reproduced image at the display device 100 in (A) normal display mode based upon the image data in a specific image file having been read out from the memory card 53 and then starts a time count on an internal timer. When a predetermined length of time (e.g., 5 sec) is counted after bringing up the reproduced image on display, the CPU 51 switches the display at the display device 100 to (B) first high-quality image display mode. As a result, the image is displayed in (A) normal display mode while the user is performing the changeover operation for selecting a new image to be brought up as a reproduced image and then the display is automatically switched to (B) high-quality image display mode when the user is likely to be able to view the displayed image more thoroughly. It is desirable that the light source brightness be gradually altered during the display mode changeover so that the user will not be disconcerted.

(Variation 4)

While an explanation is given above on an example in which the display mode at the display device 100 is switched based upon the brightness distribution in the image to be brought up on display in the reproduction mode, the display mode may instead be switched in correspondence to the scene mode assumed for the display image or in correspondence to the format with which the image data are recorded. The scene mode is one of the settings selected at the electronic camera 2 by the user in correspondence to the photographic subject. The electronic camera 2 adopts a structure that enables exposure control and focus adjustment to be executed during the photographing operation and signal processing to be executed on image signals in correspondence to the specific scene mode setting having been selected. Information indicating the scene mode setting selected for the photographing operation is appended to the image data and is thus recorded together with the image data into the memory card 53.

FIG. 19 presents a table indicating the relationship between the scene mode and the display mode. In FIG. 19, "Normal", "HDR-1" and "HDR-2" in the display mode field respectively indicate (A) normal display mode, (B) first high-quality image display mode and (C) second high-quality image display mode.

An image having been photographed in "auto" scene mode, with its histogram indicating "significant halftone" and recorded in "RAW" file format will be judged in the reproduction mode to have been photographed under front lighting, as explained earlier. The "RAW" file format is a recording format whereby the image signals are directly recorded without undergoing any signal processing.

An image having been photographed in "auto" scene mode, with its histogram indicating "more data present in upper and lower ranges" and recorded in "RAW" file format will be judged in the reproduction mode to have been photographed under back lighting, as explained earlier. "(All)" in the histogram field indicates that there is no relevance to the image brightness distribution. "(All)" in the file format field indicates that there is no relevance to the image data recording format.

While the display mode at the display device 100 is automatically switched in the electronic camera 2 in the explanation provided above, the electronic camera adopts a structure whereby the display mode is also switched in response to a display mode changeover operation signal generated via an operation member 54.

The display having been explained in reference to the third embodiment (the display device 100 providing an image display together with the corresponding Exif information displays only the image area in the high-quality image display mode) may also be provided at the display device 100 of the electronic camera 2.

In addition to the photo viewer 1 and the electronic camera 2, any of various types of electronic apparatuses with a display screen including an electronic book viewer, a computer monitor, a video monitor and a television set may be equipped with the display device 100.

While the invention has been particularly shown and described with respect to preferred embodiments thereof by referring to the attached drawings, the present invention is not limited to these examples and it will be understood by those skilled in the art that various changes in form and detail may be made therein without departing from the spirit, scope and teaching of the invention.

The disclosure of the following priority applications are herein incorporated by reference:
Japanese Patent Application No. 2005-027319 filed Feb. 3, 2005
Japanese Patent Application No. 2005-138310 filed May 11, 2005
Japanese Patent Application No. 2005-138311 filed May 11, 2005
Japanese Patent Application No. 2005-139433 filed May 12, 2005

The invention claimed is:

1. A display device, comprising:
a transmission-type color liquid crystal display module that forms an image based upon image signals;
an illuminating device that illuminates the color liquid crystal display module; and
a monochrome liquid crystal panel that allows illuminating light emitted from the illuminating device to the color liquid crystal display module to have a specific light quantity distribution, wherein:
the monochrome liquid crystal panel is disposed between the illuminating device and the color liquid crystal display module.

2. A display device according to claim 1, wherein:
the monochrome liquid crystal panel adjusts a quantity of illuminating light originating from the illuminating device in each unit area.

3. A display device according to claim 2, wherein:
the monochrome liquid crystal panel reduces the quantity of illuminating light originating from the illuminating device in each matrix area.

4. A display device according to claim 3, wherein:
the illuminating device comprises a light guide plate; and
the light guide plate, the monochrome liquid crystal panel and the color liquid crystal display module are layered one on top of another.

5. A display device according to claim 2, wherein:
the monochrome liquid crystal panel reduces the quantity of illuminating light for an area to be rendered dark within a display screen.

6. A display device according to claim 2, wherein:
the monochrome liquid crystal panel reduces the quantity of illuminating light when a brightness level indicated in display data is equal to or lower than a predetermined threshold value representing a light leakage inhibiting cutoff point.

7. A display device according to claim 6, wherein:
the monochrome liquid crystal panel increases/decreases the threshold value in correspondence to an illumination brightness level set at the illuminating device.

8. A display device according to claim 2, further comprising:
a control device that controls the monochrome liquid crystal panel so as to reduce the quantity of illuminating light over a range smaller than an area to be displayed with a brightness level lower than a predetermined brightness level.

9. A display device according to claim 8, wherein:
the control device controls the monochrome liquid crystal panel so as to alter in steps a rate at which the quantity of illuminating light is reduced over a boundary of an area where the quantity of illuminating light is to be reduced.

10. A display device according to claim 8, wherein:
the control device determines the area where the quantity of illuminating light is to be reduced based upon brightness information in the image signal corresponding to a target pixel on the color liquid crystal display module and pixels around the target pixel.

11. A display device according to claim 8, wherein:
the control device determines a rate, at which the quantity of illuminating light to illuminate a target pixel is to be reduced based upon brightness information indicated in the image signal corresponding to the target pixel on the color liquid crystal display module and pixels around the target pixel.

12. A display device according to claim 1, wherein:
the monochrome liquid crystal panel is disposed between the illuminating device and the color liquid crystal display module; and
the display device further comprises a light adjustment control device that controls the monochrome liquid crystal panel so as to illuminate specific areas on the color liquid crystal display module with different quantities of illuminating light.

13. A display device according to claim 12, wherein:
the light adjustment control device controls the monochrome liquid crystal panel so as to illuminate an image display area and a character display area with different quantities of illuminating light.

14. A display device according to claim 13, further comprising:
a light emission control device that controls a quantity of light emitted from the illuminating device, wherein:

the light adjustment control device controls the monochrome liquid crystal panel so as to reduce the quantity of illuminating light that has been raised via the light emission control device over the character display area.

15. A display device according to claim 1, wherein:
the monochrome liquid crystal panel is disposed between the illuminating device and the color liquid crystal display module; and
the display device further comprises a display control device that individually controls the illuminating device and the monochrome liquid crystal panel so as to switch, in response to a display switch instruction, between a normal display mode in which a first light emission quantity is set for the illuminating device and a light reduction rate to be achieved via the monochrome liquid crystal panel is set to a minimum level and a high-quality image display mode in which a second light emission quantity greater than the first light emission quantity is set for the illuminating device and the light reduction rate to be achieved via the monochrome liquid crystal panel is set to the minimum level.

16. A display device according to claim 15, wherein:
the light reduction rate to be achieved via the monochrome liquid crystal panel is controlled in units of specific areas defined on the color liquid crystal display module; and
the display control device also individually controls the illuminating device and the monochrome liquid crystal panel so as to switch in response to a display switch instruction to a second high-quality image display mode in which a third light emission quantity greater than the second light emission quantity is set for the illuminating device and the quantity of illuminating light, used to illuminate an area on the color liquid crystal display module corresponding to display data indicating a display brightness level equal to or lower than a predetermined value, is reduced.

17. A display device according to claim 1, wherein:
the monochrome liquid crystal panel and the color liquid crystal display module are layered one on top of another.

18. A display device according to claim 1, wherein:
the monochrome liquid crystal panel and the color liquid crystal display comprise a single same polarizing plate.

19. A camera, comprising:
a display device according to claim 12;
an imaging device; and
a focus adjustment control device, wherein:
the light adjustment control device controls the monochrome liquid crystal panel so as to illuminate an area corresponding to a focus area and an area corresponding to an area other than the focus area with different quantities of illuminating light.

20. A camera according to claim 19, wherein:
the light adjustment control device controls the monochrome liquid crystal panel so as to reduce the quantity of illuminating light, having been raised via the light emission control device, over the area corresponding to the area other than the focus area.

21. A camera comprising:
a display device according to claim 16;
an imaging device that captures a subject image and outputs image data; and
an operation member that generates a signal for setting one of a photographing mode for displaying at the display device an image based upon image data output from the imaging device, a reproduction mode for displaying at the display device an image based upon recorded image data, and a menu mode for displaying menu information at the display device menu information, wherein:
the display control device individually controls the illuminating device and the monochrome liquid crystal panel so as to select a specific display mode in response to the signal generated at the operation member.

22. A camera according to claim 21, wherein:
the display control device individually controls the illuminating device and the monochrome liquid crystal panel so as to switch to the normal display mode when the signal from the operation member indicates one the photographing mode and the menu mode and to switch to the high-quality image display mode when the signal from the operation member indicates the reproduction mode.

23. A camera according to claim 22, wherein:
the display control device individually controls the illuminating device and the monochrome liquid crystal panel so as to switch from the high-quality image display mode to the second high-quality image display mode when the signal from the operation member indicates the reproduction mode and a number of sets of data indicating brightness levels equal to or lower than a predetermined low brightness level and a number of sets of data indicating brightness levels equal to or higher than a predetermined high brightness level contained in the display data are each equal to or greater than a predetermined value.

24. A camera according to claim 22, wherein:
the display control device individually controls the illuminating device and the monochrome liquid crystal panel so as to switch from the high-quality image display mode to the normal display mode when the signal from the operation member indicates the reproduction mode and another signal constituting a thumbnail display instruction is also generated at the operation member.

25. A camera according to claim 22, wherein:
the display control device executes control so as to first switch to the normal display mode and then to the high-quality image display mode after the image is held on display in the normal display mode over a predetermined length of time when the signal from the operation member indicates the reproduction mode.

26. An electronic apparatus equipped with a display device according to claim 1.

* * * * *